US012775905B2

(12) United States Patent
Doken et al.

(10) Patent No.: US 12,775,905 B2
(45) Date of Patent: Oct. 27, 2026

(54) SYSTEMS AND METHODS FOR GENERATING GUIDANCE FOR DELIVERIES AND MONITORING DELIVERED ITEMS

(71) Applicant: Adeia Guides Inc., San Jose, CA (US)

(72) Inventors: Serhad Doken, Bryn Mawr, PA (US); Charles Dasher, Lawrenceville, GA (US); Jean-Yves Couleaud, Mission Viejo, CA (US); Reda Harb, Saint Petersburg, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/889,206

(22) Filed: Sep. 18, 2024

(65) Prior Publication Data

US 2026/0080353 A1 Mar. 19, 2026

(51) Int. Cl.
*G06Q 10/0835* (2023.01)
*G06Q 10/0833* (2023.01)

(52) U.S. Cl.
CPC ..... *G06Q 10/0835* (2013.01); *G06Q 10/0833* (2013.01)

(58) Field of Classification Search
CPC ..................................................... G06V 20/20
See application file for complete search history.

(56) References Cited

U.S. PATENT DOCUMENTS 11,615,370 B1 3/2023 Li et al.
11,699,287 B1 7/2023 Wang et al.
11,861,546 B1 * 1/2024 Wang ................. G06Q 10/0832
12,609,011 B2 4/2026 Lal et al.
2015/0186842 A1 7/2015 Daniarov
(Continued)

FOREIGN PATENT DOCUMENTS

CN 110082846 A * 8/2019 ......... G02B 27/0172
JP 2015184894 A * 10/2015

OTHER PUBLICATIONS

Merenda, Coleman, et al., Augmented reality interface design approaches for goal-directed and stimulus-driven driving tasks, 2018, IEEE transactions on visualization and computer graphics, 24.11, 2875-2885. (Year: 2018).*
(Continued)

*Primary Examiner* — Christopher Gomez
(74) *Attorney, Agent, or Firm* — HG LAW LLP

(57) ABSTRACT

Systems and methods of generating guidance for deliveries and monitoring delivered items are disclosed. A visual anchor is associated with at least a portion of a physical location of a destination for delivering a package. Based on delivery instructions for the package, a visual object corresponding to the visual anchor is created. When a match is detected between the visual anchor and the portion of the physical location as displayed within the field of view of a device, the visual object is overlaid on the portion of the physical location as displayed within the field of view of the device. Based on wireless signal characteristics extracted from a designated drop-off area of the delivery address, a user interacting with the package may be detected. If the user's wireless signal characteristic signature indicates that they are unauthorized to interact with the package, an action is performed addressing the unauthorized interaction.

20 Claims, 10 Drawing Sheets

(56) References Cited

U.S. PATENT DOCUMENTS

| | | | | |
|---|---|---|---|---|
| 2016/0343220 | A1 | 11/2016 | Grabham | |
| 2018/0121877 | A1* | 5/2018 | Doherty | G05D 1/0044 |
| 2019/0156275 | A1 | 5/2019 | Fisher et al. | |
| 2019/0161190 | A1* | 5/2019 | Gil | H04L 67/55 |
| 2019/0327449 | A1 | 10/2019 | Fu et al. | |
| 2020/0082690 | A1 | 3/2020 | Bunker et al. | |
| 2020/0122831 | A1* | 4/2020 | Rivaya | G06Q 10/083 |
| 2020/0163479 | A1 | 5/2020 | Van Valkenburg, III | |
| 2023/0089726 | A1 | 3/2023 | Subramanian et al. | |
| 2023/0222434 | A1* | 7/2023 | Johnson | G06Q 10/0832<br>705/333 |
| 2025/0061680 | A1* | 2/2025 | Moore | G06F 3/011 |
| 2026/0080732 | A1 | 3/2026 | Doken et al. | |
| 2026/0080763 | A1 | 3/2026 | Lal et al. | |

OTHER PUBLICATIONS

"Amazon Drivers Not Following Delivery Instructions," Reddit, Retrieved from https://www.reddit.com/r/AmazonVine/comments/17jkxy0/amazon_drivers_not_following_delivery_instructions/, Retrieved on Mar. 25, 2025 (7 pages).

"How often do Amazon delivery drivers follow customer's instructions?," Quora, Retrieved from https://www.quora.com/How-often-do-Amazon-delivery-drivers-follow-customer-s-instructions, Retrieved on Mar. 25, 2025 (9 pages).

Alexa, Configure an Authorization Code Grant, available online at: <https://developer.amazon.com/en-US/docs/alexa/account-linking/configure-authorization-code-grant.html>, retrieved on Mar. 19, 2025, (1 page).

Amazon, Amazon Key In-Garage Delivery, available online at: <https://www.amazon.com/Amazon-Key-In-Garage-Delivery/b?ie=UTF8&node=21222091011>, retrieved on Mar. 19, 2025 (5 pages).

Bayona et al., "Comparative Evaluation of Stationary Foreground Object Detection Algorithms Based on Background Subtraction Techniques", 2009 Sixth IEEE International Conference on Advanced Video and Signal Based Surveillance, Sep. 2009 (7 pages).

Gomez et al., "Visual SLAM-based Localization and Navigation for Service Robots: The Pepper Case," RoboCup 2018: Robot World Cup XXII 22. Springer International Publishing, 2019 (12 pages).

He et al., "High-Resolution WiFi Imaging With Reconfigurable Intelligent Surfaces," in IEEE Internet of Things Journal, 10(2):1775-1786 (2023).

Huang et al., "WiMANS: A Benchmark Dataset for WiFi-based Multi-user Activity Sensing," European Conference on Computer Vision. Cham: Springer Nature Switzerland, 2024 (39 pages).

Kulchandani et al., "Moving object detection: Review of recent research trends," 2015 International Conference on Pervasive Computing (ICPC), Pune, India, 2015 (5 pages).

Maruccia, "Wiffract" Wi-Fi method can read letters through walls, Techspot, Retrieved from https://www.techspot.com/news/100151-wiffract-wi-fi-method-can-read-letters-through.html#:%7E:text=With%20the%20appropriate%20mathematical%20model,cone%22%20in%20accordance%20with%20GTD, Sep. 14, 2023 (5 pages).

Papaioannou et al., "Fusion of Radio and Camera Sensor Data for Accurate Indoor Positioning," IEEE 11th International Conference on Mobile Ad Hoc and Sensor Systems, IEEE, 2014, pp. 109-117.

Robertson, "Smaller, faster UPS handheld computer coming to drivers today", available online at: <https://www.theverge.com/2012/2/29/2833318/ups-diad-v-handheld-shipping-computer-launched>, Mar. 1, 2012 (5 pages).

Santoboni et al., "Wireless LAN sensing with smart antennas," 16th European Conference on Antennas and Propagation (EuCAP), IEEE, 2022 (5 pages).

Strohmayer et al., "Directional Antenna Systems for Long-Range Through-Wall Human Activity Recognition," IEEE International Conference on Image Processing (ICIP), IEEE, 2024 (6 pages).

The Essential Oauth Primer: Understanding Oauth for Securing Cloud APIS, whitepaper from Ping Identity, downloadable at https://hub.pingidentity.com/white-papers/3119-essential-oauth-Primer, retrieved on Mar. 19, 2025 (5 pages).

The Truth About Porch Pirates (and How to Stop Them), available online at: <https://www.adt.com/resources/porch-pirates>, retrieved on Mar. 19, 2025 (7 pages).

U.S. Appl. No. 18/620,633, filed Mar. 28, 2024, Title: Systems and Methods for Enhanced Video Doorbell Experiences (Not provided; USPTO in possession of specification, claims, and prosecution history).

U.S. Appl. No. 18/620,656 , filed Mar. 28, 2024, Title: Systems and Methods for Enhanced Video Doorbell Experiences (Not provided; USPTO in possession of specification, claims and prosecution history).

Unia et al., "Visual-SLAM for Environment Detection and Path Planning," International Research Journal of Engineering and Technology, 7(10):1340-1343 (2020).

Wolfson, "Everything you need to know about Amazon Key In-Garage Delivery, an exclusive Prime member benefit", Amazon, available online at: <https://www.aboutamazon.com/news/amazon-prime/what-is-amazon-key-in-garage-delivery>, Sep. 28, 2023 (5 pages).

U.S. Appl. No. 18/888,971, filed Sep. 18, 2024, Dhananjay Lal.

U.S. Appl. No. 18/889,207, filed Sep. 18, 2024, Serhad Doken.

U.S. Appl. No. 19/569,085, filed Mar. 17, 2026, Dhananjay Lal.

* cited by examiner

SYSTEMS AND METHODS FOR GENERATING GUIDANCE FOR DELIVERIES AND MONITORING DELIVERED ITEMS

BACKGROUND

This disclosure relates to providing a user interface for guiding delivery of packages. This disclosure also relates to Wi-Fi sensing for monitoring package deliveries.

SUMMARY

When delivering packages, delivery drivers are generally expected to follow a customer's delivery instructions, such as instructions to drop off the package in a specific area. The delivery instructions also provide guidance and clarification to the delivery driver in identifying the correct area to deliver the package, such as granular navigation steps to guide the delivery driver to a particular drop-off area or a description of the correct unit in 44a multi-unit building. However, delivery instructions are often overlooked, misread, or difficult to comprehend during the delivery process, such as when a delivery driver is rushing to make multiple deliveries on time. Such issues result in packages being delivered to incorrect, unsecure, or undesirable areas. In one approach, delivery instructions may be presented as supplemental text in a delivery user interface (UI) that displays general shipment information (e.g., delivery address and package code). However, displaying text via such UI may require scrolling through the display, which can result in the supplemental text being overlooked. The supplemental text may also lack clarity or may not be sufficiently descriptive, resulting in the delivery driver delivering to the wrong location, which can result in, e.g., their device unnecessarily recalculating navigation to the correct delivery destination. In another approach, the delivery UI may be communicatively connected with a mapping or navigation application. However, images and navigation instructions from such mapping applications may not provide delivery instructions at a granular level (e.g., sub-navigation steps). Moreover, images of a delivery address in the mapping applications may sometimes be blurred for privacy, and fail to indicate a visual representation of a preferred portion of a delivery address designated for drop-off.

To help solve these problems, systems and methods are provided herein for providing an improved user interface for providing guidance for delivery of packages. In some embodiments, a Delivery Guidance Application (DGA) is provided for generating and presenting guidance for deliveries. In some embodiments, the DGA receives an order for a delivery. The DGA may obtain a visual representation of a physical location associated with the order. The physical location may comprise the destination (e.g., delivery address) of a package associated with the order. The DGA may receive delivery instructions for delivering a package. The DGA may associate a visual anchor with at least a portion of the physical location of the visual representation. For instance, the visual representation may comprise an image, multiple images, volumetric three-dimensional (3D) display, or video (e.g., of the delivery location, e.g., delivery address) and/or an augmented reality (AR) and/or virtual reality (VR) representation and/or any other suitable representation, e.g., associated with the delivery location.

A visual anchor (also referred to as an anchor, virtual anchor, or geospatial anchor) may be associated with (e.g., placed at) a reference point(s) in the real world. In other words, the reference point(s) may be a fixed location and/or orientation in physical space that is assigned to the visual anchor. In some examples, the visual anchor may be associated with a real-world point that is represented in the visual representation, (e.g., a front door step of the delivery location). The DGA may determine the position for placing the visual anchor (e.g., the real-world point to associate the visual anchor with) based on location data (e.g., GPS data) of a real-world point(s) corresponding to the visual representation of the portion of the physical location.

Visual objects (such as image- or video-based objects, or virtual objects, and/or other suitable UI elements) can be attached to, or positioned relative to, the visual anchor. That is, the visual anchor indicates the position where to place the visual object (e.g., on a display of the real-world, in an AR and/or VR environment, or other suitable environment, such as a mapped environment). The DGA may generate a visual object corresponding to the visual anchor, wherein the visual object comprises digital content indicative of the delivery instructions. The DGA may provide, for display on a user device of the delivery driver, the visual object overlaid at least a portion of the physical location as displayed within a field of view of the user device.

In some embodiments, the DGA tracks a location of the user device of the delivery driver. Based on determining that the location of the user device is within a certain distance of the physical location of the delivery address, the DGA may send the visual anchor to the user device.

In some embodiments, the DGA detects, on the user device, a match between the visual anchor and at least a portion of the physical location as displayed within the field of view of the user device. In some embodiments, providing the visual object overlaid on the at least a portion of the physical location as displayed within the field of view of the user device is based on the detected match. For instance, the DGA may determine, at the user device, that the location in the field of view of the user device matches the address data of the delivery address. Based on the determination, the DGA may identify the appropriate visual anchor within that scene to overlay the visual object (e.g., the DGA may send the visual object to the user device and attach the visual object to the visual anchor).

In some embodiments, the delivery instructions comprise at least one of a description of at least a portion of the physical location, confirmation of address, data related to the order, data related to the package, data related to a user profile associated with the order, or sub-navigation steps for navigating from a first point at the physical location to a second point at the physical location.

In some embodiments, the visual object is a user interface (UI) element, an augmented reality (AR) object, or a virtual reality (VR) object. For instance, a UI element may include text, images, audio recording, or a video depicting directions, or any other suitable UI element.

In some embodiments, obtaining the visual representation of the physical location further comprises receiving, from a second user device associated with a user profile associated with the order, an upload of the visual representation of the physical location.

In some embodiments, obtaining the visual representation of the physical location further comprises sending a query to at least one data source, wherein the query comprises an address of the destination (e.g., delivery address), and receiving, from the at least one data source, the visual representation of the physical location corresponding to the address of the destination.

In some embodiments, the delivery instructions are based on at least one parameter comprising one or more of a time of day, a day of the week, environment, value of the package, contents of the package, or user preferences. In some embodiments, the DGA determines a change in the at least one parameter and modifies the visual object based on the change in the at least one parameter.

In some embodiments, the DGA collects, from at least one sensor, image or inertial data in relation to the physical location. Based on the image or inertial data in relation to physical location, the DGA generates sub-navigation steps for navigating from a first point at the physical location to a second point at the physical location. The digital content indicative of the visual object may be further based on the sub-navigation steps.

A benefit of the described systems and methods includes providing a user interface with improved accuracy and efficiency by dynamically providing visual representations of granular delivery instructions when the delivery driver is near or at the delivery address. The efficiency and accuracy of the user interface is further improved by dynamically modifying the visual representation based on changes in conditions. For instance, the visual object can be automatically modified to reflect alternative delivery instructions based on a change in weather or based on the contents (e.g., high value or fragile) of the package.

When a package has been delivered, the package oftentimes remains outside of secured premises (e.g., a porch or driveway) for a period of time until the customer returns home and/or picks up the delivered package(s). During that time, the package may be vulnerable to theft, damage, or tampering. In one approach, surveillance cameras may be installed to monitor the delivered package. The surveillance cameras may also be used to recognize whether a user interacting with the package is authorized to do so. However, cameras may be limited in accurately capturing images or video of the package or a user interacting with the package. For example, the package or a person may be obstructed by another object (e.g., a bush) or may be outside the field of view of the cameras. It can also be difficult to capture images at night due to limited lighting, or even during the day due to glares caused by lighting. The surveillance cameras also do not distinguish whether the person interacting with the package is authorized to do so. Surveillance cameras can also raise privacy concerns for customers. Moreover, the surveillance cameras may be continuously capturing video, which inefficiently utilizes a large amount of processing power, storage, and other finite computing and network resources.

To help solve these problems, systems and methods are provided herein for monitoring package deliveries at a delivery address by leveraging the wireless network of the delivery address. In some embodiments, a Package Monitoring Application (PMA) is provided for monitoring delivered packages. In some embodiments, the PMA receives, at a home Wi-Fi platform from a second platform, a) notification from a second platform that a package was delivered at a delivery address associated with the home Wi-Fi platform and (b) data associated with the package (e.g., shipment details, package dimensions, package contents, customer information). Based on receiving the notification, the PMA may extract, via access points associated with the home Wi-Fi platform, wireless signal characteristics of a designated drop-off area associated with the delivery address. The PMA may determine, based on a portion of the wireless signal characteristics corresponding to a particular time, that a user is interacting with the package in the designated drop-off area. The PMA may compare the portion of the wireless signal characteristics corresponding to the particular time to a wireless signal characteristic signature of one or more authorized users associated with the delivery address to determine whether the user that is interacting with the package is an unauthorized user. Based on determining that an unauthorized user is interacting with the package, the PMA may perform an action to address the interaction of the unauthorized user with the package.

In some embodiments, the PMA performs the action to address the interaction of the unauthorized user with the package by sending an alert to at least one user device associated with the home Wi-Fi platform or a service provider of the home Wi-Fi platform that an unauthorized user has interacted with the package.

In some embodiments, the wireless signal characteristics comprise channel state information (CSI) data.

In some embodiments, the PMA verifies that the package was delivered to the delivery address based on determining a delta value based on comparing a) the extracted wireless signal characteristics of the designated drop-off area before the particular time and b) a wireless signal characteristic signature of the designated drop-off area. The PMA may compare the delta value with the data associated with the package. The PMA may determine, based on the comparing, that the delta value corresponds with the wireless signal characteristics of the delivered package.

In some embodiments, the data associated with the package is obtained from at least one of an RFID tag on the package, a three-dimensional (3D) printed code on the package, or image data of the package based on signal beamforming.

In some embodiments, the PMA determines that a user (such as an authorized family member or neighbor, or an unauthorized stranger) is interacting with the package in the designated drop-off area further based on detecting wireless signal characteristics of the user at the designated drop-off area during the particular time. The PMA may determine a change in the delta value corresponding with the delivered package during the particular time.

In some embodiments, the PMA manages a queue of a plurality of authorized wireless signal characteristic signatures. Each respective authorized wireless signal characteristic signature may correspond to an authorized user for interacting with the package.

In some embodiments, the PMA may determine whether the user that is interacting with the package is an unauthorized user further based on comparing the wireless signal characteristic signature of the user with the plurality of authorized wireless signal characteristic signatures. The PMA may determine that no matches were identified from the comparing.

In some embodiments, the package is one of a plurality of packages delivered at the delivery address. The PMA may manage a queue of a plurality of package wireless signal characteristic signatures. Each one of the plurality of package wireless signal characteristic signatures may correspond to a respective one of the plurality of packages delivered at the delivery address. The PMA may monitor each respective one of the plurality of packages based on comparing the corresponding each one of the plurality of package wireless signal characteristic signatures with the collected wireless signal characteristics of the designated drop-off area.

In some embodiments, at least one of the access points comprises an access point with the closest distance of the access points to the designated drop-off area. The closest access point may be selected to collect wireless signal data (e.g., CSI, RSSI). The closest access point may be used in conjunction with a second access point to compute wireless signal characteristics based on the collected wireless signal data. In some embodiments, an RFID tag is affixed to the package, and the RFID tag is configured to be activated by a Wi-Fi signal from the closest of the access points to the package.

In some embodiments, where the package is enroute, the notification is a message comprising at least one of an estimated time of delivery of the enroute package, or that the user device is within a certain distance of the delivery address while enroute with the enroute package.

A benefit of the described systems and methods includes conserving finite computing and network resources by leveraging the existing home Wi-Fi network of a delivery address to monitor packages and identify users interacting with the packages, instead of installing and continuously operating cameras and additional surveillance equipment at the delivery address. Additionally, the accuracy and availability of such detection are improved because the Wi-Fi sensing system can be used to detect packages and users during nighttime or detect packages and users that could otherwise be occluded from the field of view of a camera.

Another benefit includes increasing accuracy and efficiency of capturing and computing wireless signal characteristics by dedicating a single access point that is located closest to the delivered package for capturing wireless signal data, which may then be used in conjunction with a second access point to compute wireless signal characteristics.

Another benefit includes increasing accuracy of data collection and computations because dedicating a single access point that is located closest to the delivered package for capturing wireless signal data (while delegating computation operations to the remaining access points in the home Wi-Fi network) increases the accuracy and efficiency of collecting and computing wireless signal characteristics of nearby objects.

Yet another benefit includes improving effective communication for RFID tags affixed to packages. For example, the RFID tag may be equipped with a modulation/demodulation circuit capable of processing high-frequency signals, which allows effective communication using the same frequency bands as Wi-Fi. This can include backscatter communication protocols where the tag modulates the incident Wi-Fi signals to transmit data back to the reader which may be present in a smart home or incorporated into a Wi-Fi access point. Given the potential for interference in these crowded frequency bands, the Wi-Fi access point may be configured to pause traffic on non-essential devices within the home in order to clear the way for the RFID tag to communicate.

BRIEF DESCRIPTION OF THE FIGURES

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
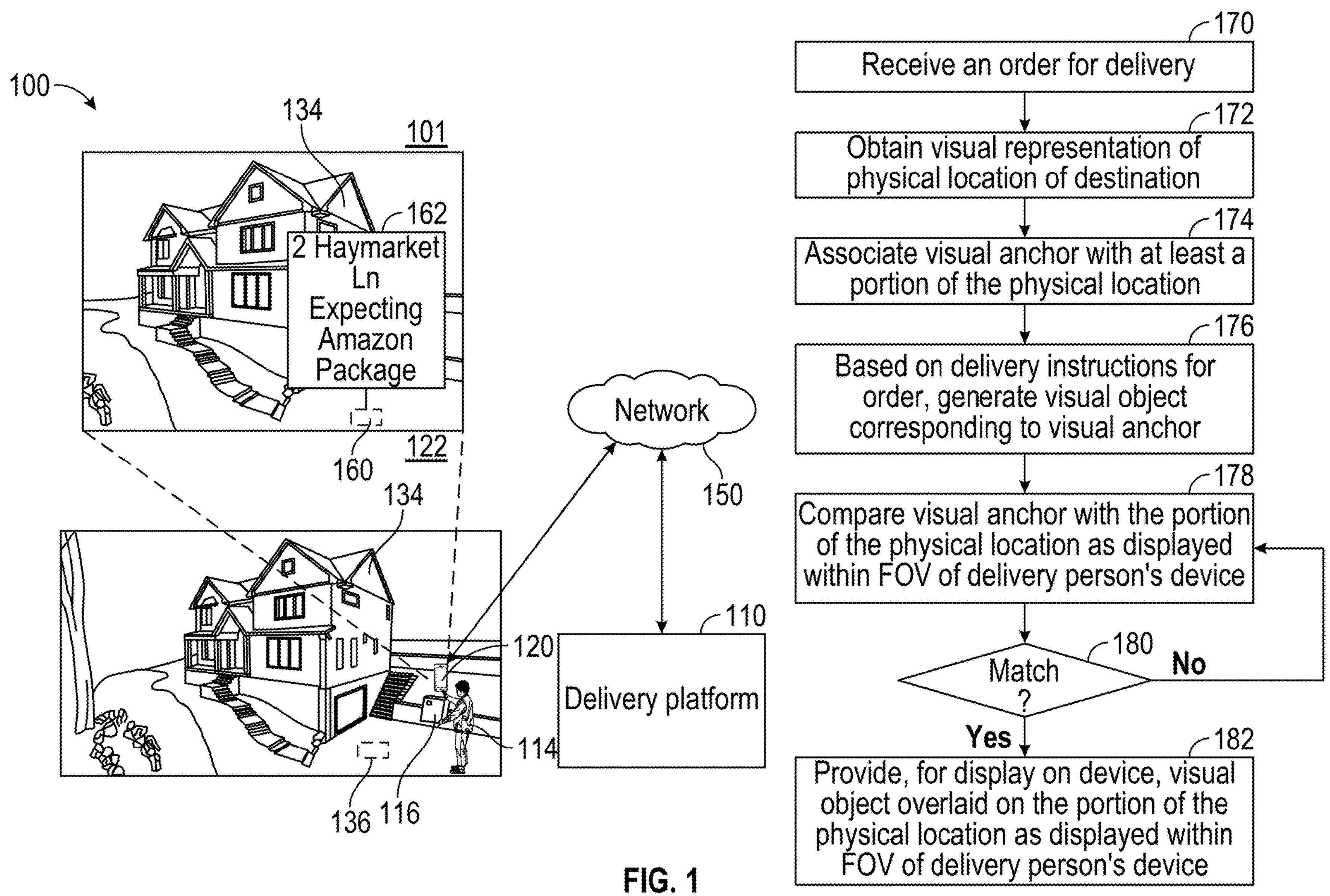
FIG. 1 shows an example scenario of providing guidance for deliveries, in accordance with various embodiments of this disclosure.

FIG. 1 shows an example scenario 100 of providing guidance for deliveries, in accordance with various embodiments of this disclosure. In some embodiments, scenario 100 comprises a delivery platform 110, network 150, and user device 120. In some embodiments, a Delivery Guidance Application (DGA) is configured to perform the functionalities (or any suitable portion of the functionalities) described herein. The DGA may provide a user interface (UI) 101, by way of user device 120, comprising visual instructions to guide a delivery driver 114 in making package deliveries accurately and efficiently. For example, the DGA associates a visual anchor 160 with at least a portion of the physical location of the delivery address 134 (e.g., as determined from an image of the physical location of the delivery address 134 uploaded by the customer or obtained by the DGA from public mapping databases).

For instance, the visual anchor 160 may be associated with any point(s) or region within the physical location of the entire delivery address 134 (e.g., with respect to the real world). In an example, the visual anchor 160 may correspond with at least a portion of the physical location of delivery address 134, such as a doorstep, the front door, the back door, a porch bench, a table in the front yard, a unit within a multi-dwelling unit (MDU)) (e.g., the portion of the physical location of delivery address 134 may be any suitable area associated with the delivery address 134). In another example, the visual anchor 160 may correspond with a designated drop-off area 136 (e.g., the portion of the physical location of the delivery address 134 may be the designated drop-off area 136, such as a spot in front of the garage). In another example, the visual anchor 160 may correspond with an area different from the designated drop-off area, and its corresponding visual object 162 may comprise instructions guiding the delivery driver 114 from a first point at the delivery address 134 to the designated drop-off area (e.g., the portion of the physical location of the delivery address 134 may be the front door, while the designated drop-off area 136 may be a spot in front of the garage). In some instances, the visual anchor 160 may correspond to the physical location of the entire delivery address 134 itself (e.g., the entire house or building).

In some embodiments visual anchor 160 is created (e.g., placed, or associated with a portion of the physical location of delivery address 134) when an order is accepted, processed, and/or ready to be shipped. For example, visual anchor 160 may be generated by an e-commerce backend. In order to create a visual anchor, computer vision techniques may be used for feature detection (i.e., to detect distinct features of a selected object or image or even a portion of an image). Detailed data of the anchor is then used as reference data. In order to create a visual anchor from a visual representation (e.g., an image or a picture), a high-resolution image may be required. This image may be provided by the customer, since public images might depict an overall view of a structure (e.g., building) that may not include specific objects that the customer desires to utilize as an anchor. Once the customer submits or uploads the image to a dedicated service (e.g., service associated with delivery platform 110, such as the customer's e-commerce provider), the image quality is checked and the image may then be converted to grayscale to simplify feature extraction. Keypoint detection and description (i.e., identifying specific location in the image and describing the local appearance around each keypoint to create feature vectors) may be achieved using algorithms such as the Shi-Tomasi Corner Detector, and Speeded-Up Robust Features (SURF) or Oriented FAST and Rotated BRIEF (ORB). Once extracted, these features are used to create the anchor by defining its position and orientation in the real world. When resolving the anchor, these anchor features are then used to be compared against (e.g., features extracted from a camera feed are compared to stored anchor features).

For instance, a virtual object 162 corresponding to the visual anchor 160 may comprise a visual representation of delivery instructions or any other suitable data relating to the order or package (e.g., order ID). When a camera of user device 120 (e.g., operated by delivery driver 114) is pointed at a scene (e.g., a real-world scene, such as the physical property of delivery address 134), the DGA may determine whether there is a match between the visual anchor 160 (e.g., provided to user device 120) and at least a portion of the physical location of the delivery address 134 as displayed within the field of view 122 of user device 120 (e.g., an image of at least a portion of the physical location of delivery address 134 being captured by the camera and/or being provided via a passthrough display of an AR device). If a match is found, the DGA may display visual object 162 overlaid on the delivery address 134 as displayed within the field of view 122 of user device 120, to guide delivery driver 114 in placement of the package. Delivery address 134 may be associated with, for example, a private residence (e.g., a house, a multi-dwelling unit (MDU)), a business, a school, a public area, and/or any other suitable location.

Figure 6:
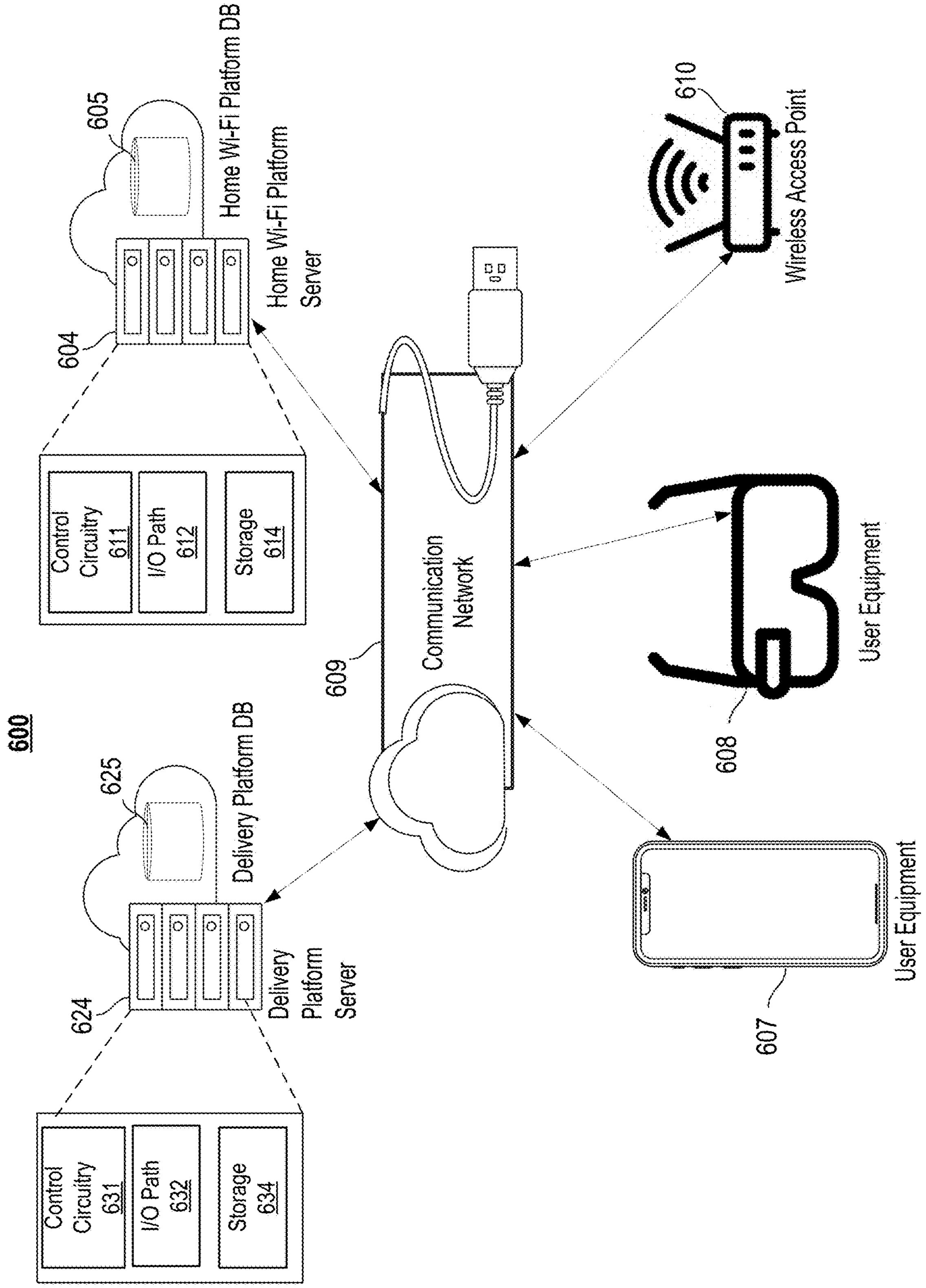
FIG. 6 shows an illustrative system, in accordance with some embodiments of this disclosure, in accordance with various embodiments of the disclosure.

In some examples, the DGA may be executed at least in part at user device 120, delivery platform 110, databases 605 or 625 of FIG. 6, and/or servers 604 or 624 of FIG. 6, or one or more remote servers (e.g., associated with platform 110), and/or at or distributed across any of one or more other suitable computing devices, in communication over any suitable type of network (e.g., the Internet, network 150). In some embodiments, user device 120 may be, for example, a smartphone, a tablet, a handheld device, a digital assistant, a wearable camera, an XR device or any other suitable device capable of processing XR content, a laptop, a delivery information acquisition device (DIAD), or any other suitable device, or any combination thereof.

In some embodiments, delivery platform 110 comprises any suitable entity(s) that delivers or otherwise provides (or oversees or controls the provision of) an item such as a package 116 to a particular destination location (e.g., delivery address 134). For example, delivery platform 110 may be an e-commerce platform, such as an online retailer or a plurality of online retailers that delivers (or otherwise coordinates the delivery of) purchased items to customers. For example, delivery platform 110 may be an online retailer that is communicatively connected with a carrier platform (e.g., a postal service platform or other suitable delivery service platform). In another example, delivery platform 110 may be a carrier platform. In some embodiments, delivery platform 110 provides a UI 101 to a device associated with and/or communicatively connected with the delivery platform 110 (e.g., user device 120), wherein the UI 101 comprises a visual representation of delivery instructions.

In some embodiments, user device 120 is communicatively connected with delivery platform 110. User device 120 may be associated with a delivery driver 114 (also referred to as delivery person) delivering package 116. Delivery platform 110 may estimate the current location of package 116 until delivery of the package 116 by tracking the location (e.g., GPS data) of user device 120 and/or based on other logistical data (e.g., scheduled pickup of packages). User device 120 may be configurable to display a UI 101, for instance comprising a visual representation of delivery instructions, media, or other suitable visual content. User device 120 may also be coupled to a camera or other image sensors. User device 120 may also be coupled to an inertial measurement unit (IMU) or other inertial sensors. In some embodiments, user device 120 is an augmented reality (AR) device, a virtual reality (VR) device, or any other suitable extended reality (XR) device.

According to some embodiments, at step 170 of FIG. 1, the DGA receives an order for delivery. In some examples, delivery platform 110 may prepare package 116, corresponding to one or more items from the order, for delivery to a destination (e.g., delivery address 134).

According to some embodiments, at step 172 of FIG. 1, based on receiving the order, the DGA obtains an image of the delivery address 134. In some embodiments, the DGA obtains the image by querying a database of images corresponding to the delivery address 134, such as from a web mapping platform or a real estate platform. In some embodiments, the DGA obtains the image by capturing image data of the physical location of the delivery address 134 and/or based on receiving an upload from a user (e.g., a customer residing at delivery address 134). For instance, the DGA may scan, by image sensors or any suitable device, the physical location of the delivery address 134. Based on the scan, the DGA may create a 3D model or a panoramic image of the delivery address 134. In some embodiments, the DGA may receive an upload of the image by a user device of the customer of the order. For instance, the DGA may provide to the user device a user interface (UI) through which the customer can upload the image.

Additionally, or alternatively, the DGA obtains delivery instructions associated with the order. In some embodiments, the DGA provides the user device of the customer with a UI through which the customer can input delivery instructions for the package 116. For example, delivery instructions may comprise supplemental data relating to the package 116 that may be provided via UI 101 on user device 120 to guide delivery driver 114 in delivering package 116. Examples of delivery instructions may include: the data identifying the delivery address 134 (e.g., GPS coordinates, street address, cross streets, nearby landmarks, characteristics of the delivery address such as color of the building or the type or structure of the building); contents of the package 116 (e.g., fragile items, perishable items, high value items), characteristics of the package 116 (e.g., size, shape, color, weight); other packages associated with the order (e.g., number of packages for the order or upcoming orders; characteristics of each of the packages); expected delivery time and date; a designated drop-off area 136 associated with the delivery address (e.g., in front of the garage door, on the porch); sub-navigation steps (such as guidance from a first point (e.g., driveway entry) at the delivery address to a second point (e.g., front doorstep); access or security information associated with the delivery address 134 (e.g., gate code); special handling instructions (e.g., fragile or bulky items); customer information (e.g., customer order history; frequency of customer's orders over a particular time period or other data; level of customer's membership with delivery platform 110 or other suitable data indicating whether the customer is a repeat or high-value customer; data relating to the package recipient if they are a different person from the customer); any other suitable delivery instructions; or a combination thereof.

In some embodiments a user account (e.g., associated with delivery platform 110) is associated with multiple delivery instructions. For example, the different delivery instructions may be based on product type (e.g., meals, retail, grocery, pharmacy, bulky or oversized items). For instance, the customer may have different delivery instructions associated with their account for orders that include perishable food, chemicals such as household cleaning supplies, or bulky items such as furniture. The appropriate delivery instructions may be selected (e.g., via a UI element provided by delivery platform 110 at the customer's user device) after the order is placed. In some embodiments, the delivery instructions are automatically selected by the DGA (e.g., by way of delivery platform 110) based on the product type.

Additionally, or alternatively, multiple user accounts may be associated with the same delivery platform 110. For example, two residents of delivery address 134 each have their own respective account associated with delivery platform 110, and each resident has their own set of delivery instructions for dropping off packages to the same delivery address 134.

In some embodiments, the delivery instructions are conditional upon certain parameters. Such parameters may include, for example, a time-based parameter (e.g., time of day, day of week, holidays); environmental-based parameter (e.g., weather, landscape); parameter based on package data (e.g., contents of package such as perishable, fragile, time-sensitive, or high value items; size of package); parameters based on user behavior or preferences (e.g., instructions history of the customer for previous orders); any other suitable condition; or a combination thereof. For instance, delivery instructions may include default instructions to deliver all packages in front of the garage. If it is raining, the delivery instructions may include conditional instructions to deliver packages under a covered area such as a porch bench. If the package contents include a high-value or fragile item, the delivery instructions may include conditional instructions to place the package in a secure area at the back of the delivery address or provide a code to a lock box at the delivery address, or to ring the doorbell to directly hand the package to the customer.

In some embodiments, the DGA may receive delivery instructions by way of providing a UI to a user device of the customer for input. For example, through the UI, the customer may provide text instructions; mark up the image of the delivery address 134; upload a supplemental image (e.g., of a designated drop-off area of the delivery address or images of the delivery address captured from various angles); upload a video simulating sub-navigation steps; upload an audio recording of spoken instructions; or other suitable techniques for providing delivery instructions. For instance, when the customer marks up the image of the delivery address 134, they may draw a circle around or make a hand gesture in relation to a designated drop-off area 136 or to a particular unit if the delivery address is a multi-dwelling unit. In some embodiments, the DGA uses the marked-up image or the motion data of the hand gesture to help identify the visual anchor 160. In another instance, the customer may draw visual sub-navigation instructions or make a gesture in relation to the image that simulates sub-navigation instructions with respect to the delivery address 134. In some embodiments, the DGA may determine the delivery instructions from data related to the order. For instance, the data associated with the order may include the location of the delivery address 134 (e.g., street address), package 116 recipient name, dimensions of the package 116, and/or estimated time of delivery. In some embodiments, the DGA may determine the delivery instructions from an order history of the customer and/or customer preferences. For instance, delivery instructions from the three most recent orders of the customer may include certain information, such as the customer's preferred designated drop-off area 136.

According to some embodiments, at step 174 of FIG. 1, the DGA associates a visual anchor 160 with at least a portion of the physical location of the delivery address 134. In some instances, the visual anchor 160 may correspond to any suitable area of the delivery address 134, such as the front door; the back steps; a particular unit within a multi-dwelling unit (MDU) such as unit 204 of MDU 202 of FIG. 2; a designated drop-off area 136, or any other suitable portion of the physical location of delivery address 134. In some examples, visual anchor 160 corresponds to a portion of the delivery address (e.g., front door) that is different from the designated drop off area (e.g., spot in front of garage) and the corresponding visual object 162 may comprise instructions guiding the delivery driver 114 from the front door to the spot in front of the garage. In some examples, the visual anchor 160 may correspond to the entire building of delivery address 134.

A visual object 162 corresponding to the visual anchor 160 may comprise a visual representation of delivery instructions. When a camera of user device 120 is pointed at a scene (e.g., a real-world scene, such as the physical location of delivery address 134), the DGA may determine whether there is a match between the visual anchor 160 (e.g., provided to user device 120) and at least a portion of the physical location of the delivery address 134 as displayed within the field of view 122 of user device 120. If a match is found, the DGA may display visual object 162 overlaid on the delivery address 134 as displayed within the field of view 122 of user device 120.

In some embodiments, the visual anchor 160 corresponds to multiple visual objects. For instance, alternative visual objects corresponding to the same visual anchor may be rendered based on different conditions.

In some embodiments, multiple visual anchors correspond to the same visual object. For instance, delivery driver 114 may navigate through delivery address 134, and as different visual anchors (each associated with a different location at delivery address 134) match the field of view of delivery driver's 114 device 120, the same visual object may be rendered again for each match. Multiple visual objects and anchors are described in further detail in FIGS. 3A, 3B, and 3C.

In some embodiments, the DGA associates the visual anchor 160 with at least a portion of the physical location of the delivery address based on delivery instructions. For example, if the delivery instructions indicate that the package should be delivered to a particular designated drop-off area, the DGA may place the anchor at a location corresponding to the designated drop-off area. In another example, if the delivery instructions indicate that the package should be delivered to a particular unit within an MDU (e.g., the delivery instructions provide sub-navigation steps to guide a delivery driver 114 to the particular unit), then the DGA may identify such unit based on the delivery instructions and place the anchor at the location corresponding to the identified unit.

In some embodiments, the customer specifies the visual anchor 160 by specifying an area or region of interest in the uploaded image of the delivery address 134. For instance, the DGA may determine that a portion of the physical location of the delivery address was specified based on the customer marking up the image (e.g., circling the area of interest). In some instances, the DGA determines the portion of the physical location of the delivery address based on data received from the customer's hand gesture or spoken command in relation to the image, the hand gesture or spoken command indicating the area of interest. In some instances, other suitable methods of input may be obtained for determining the visual anchor 160.

In some embodiments, the DGA provides a default visual anchor. For example, the DGA may determine the default visual anchor based on a salient image or salient portion or feature of an image (e.g., an object with a particular likelihood to be seen by a particular number of viewers or portion of a population when viewing the image in a specific direction). For instance, the default visual anchor may be a vehicle parked in a driveway, a fountain, a mailbox stand, or any other suitable object or feature. In some embodiments, the DGA recommends where to place the visual anchor based on the image of the delivery address 134 and/or any other suitable characteristic(s) of the image. The DGA may provide a prompt to the customer including a user-selectable option to accept or modify the recommended visual anchor.

In some embodiments, the DGA provides a visual anchor to the user device 120 to help the delivery driver 114 locate and/or verify the correct delivery address 134 (e.g., find the correct house or building in a neighborhood or the correct unit of an MDU), wherein the visual anchor is created irrespective of delivery instructions, if any. For example, the DGA may create the visual anchor automatically based on receiving the order. In some instances, the visual anchor may be associated with a visual object comprising digital content indicative of details about the order (e.g., address or delivery date). In some embodiments, once the DGA detects that the delivery driver 114 has arrived at the correct delivery address 134, the DGA may subsequently present a second visual object (e.g., when its associated anchor matches the corresponding portion of the physical location as displayed within the field of view of user device 120) representing any delivery instructions the customer may have. For instance, the DGA may verify, based on the location of user device 120 that the delivery driver 114 is correctly located at the delivery address 134. In another instance, the user device 120 may automatically send a confirmation to the DGA when the visual anchor matches the portion of the physical location of the delivery address 134 as displayed within the field of view of user device 120. In another instance, delivery driver 114 may send a confirmation via user device 120 upon seeing the first visual object verifying the correct address. In some instances, the second visual object may be associated with the same visual anchor as the first visual object. The DGA may display the second visual object at a certain time after displaying the first visual object or when the delivery driver 114 (via user device 120) is located at a particular location at the delivery address 134 (e.g., delivery driver 114 has moved from the driveway entrance and to the front porch, while the real-world point corresponding to the first visual anchor remains within the field of view of the user device 120). In another instance, the second visual object may be associated with a second visual anchor different form the first visual anchor (e.g., first visual anchor may be associated with the driveway entrance, and the second visual anchor may be associated with the front porch).

In some embodiments, the DGA may use other suitable factors to identify the basis (e.g., the real-world object corresponding to the reference point of the anchor) for associating the anchor with. For example, the DGA may associate the visual anchor with a particular point of the physical location of the delivery address 134 based on anchors used for a most recent set of orders of the customer.

According to some embodiments, at step 176 of FIG. 1, based on the delivery instructions for the order, the DGA generates a visual object 162 corresponding to the visual anchor 160. In some embodiments, the visual object 162 is a virtual object(s), a UI element(s), or other suitable visual element(s) that is attached to, or positioned relative to, the visual anchor 160. The DGA may display the visual object 162 (e.g., via a display of user device 120) by overlaying the visual object 162 on the physical location of delivery address 134 as displayed within the field of view 122 of the user device 120.

In some embodiments, the visual object 162 comprises a visual representation of at least a portion of delivery instructions. For example, visual object 162 may include a graphic(s) and/or text indicating various information from the delivery instructions, such as data identifying the delivery address 134 (e.g., GPS coordinates, street address, cross streets, nearby landmarks, characteristics of the delivery address such as color of the building or the type of structure of the building); confirmation of address (e.g., stating the address); contents of the package 116 (e.g., fragile items, perishable items, high value items), characteristics of the package 116 (e.g., size, shape, color, weight); other packages associated with the order (e.g., number of packages for the order or upcoming orders; characteristics of each of the packages); expected delivery time and date; designated drop-off area 136 associated with the delivery address (e.g., in front of garage door, on the porch); sub-navigation steps (such as guidance from a first point (e.g., driveway entry) at the delivery address to a second point (e.g., front doorstep); access or security information associated with the delivery address 134 (e.g., gate code); special handling instructions (e.g., fragile or bulky items); customer information (e.g., customer order history; frequency of customer's orders over a particular time period or other data; level of customer's membership with delivery platform 110 or other suitable data indicating that customer is a repeat or high value customer; data relating to the package recipient if they are a different person from the customer); any other suitable delivery instructions; or a combination thereof.

Additionally, or alternatively, in some embodiments, the visual object 162 comprises an audio or audio-visual representation of the delivery instructions (e.g., video or audio recording for playback).

In some embodiments, the DGA modifies the visual object 162 based on determining whether certain parameters are met. For example, delivery instructions may include alternative instructions based on changes in certain parameters such as environmental conditions, time and date conditions, package conditions, user preferences, or other suitable conditions. In some embodiments, the DGA monitors these conditions. If the DGA determines a change in the conditions and/or that certain conditions are met, then the DGA may identify the alternative instructions corresponding to such conditions. The DGA may modify the visual object 162 such that the visual object presents a visual representation of the alternative instructions. Modifying the visual object 162 based on conditions is described in further detail in FIGS. 3A, 3B, and 3C.

According to some embodiments, at steps 178, 180, and 182 of FIG. 1, the DGA resolves the visual anchor 160 with respect to the user device 120 and renders the visual object 162 via a display of the user device 120. For example, when the DGA detects that the user device 120 is within a certain distance of delivery address 134 (e.g., based on location data of user device 120), the DGA may send the visual anchor 160 to user device 120. In some examples, the DGA may send the visual anchor 160 to the user device 120 based on other suitable factors, such as the DGA identifying, from a recently placed order for package 116, that shipment of the package 116 has been assigned to delivery driver 114. The DGA may determine, at the user device 120, whether the real-world object corresponding to the visual anchor 160 (e.g., the physical location of delivery address 134 or a portion thereof such as designated drop-off area 136) is within the field of view 122 of user device 120. For instance, the DGA may compare, at the user device 120, the visual anchor 160 with a portion of the physical location of delivery address 134 (e.g., designated drop-off area 136) displayed within the field of view 122 of user device 120. If the DGA determines a match based on the comparison, the DGA displays the visual object 162 on a display of the user device 120. For example, the DGA may overlay the visual object 162 on the physical location of delivery address 134 as displayed within the field of view 122 of user device 120.

Figure 2:
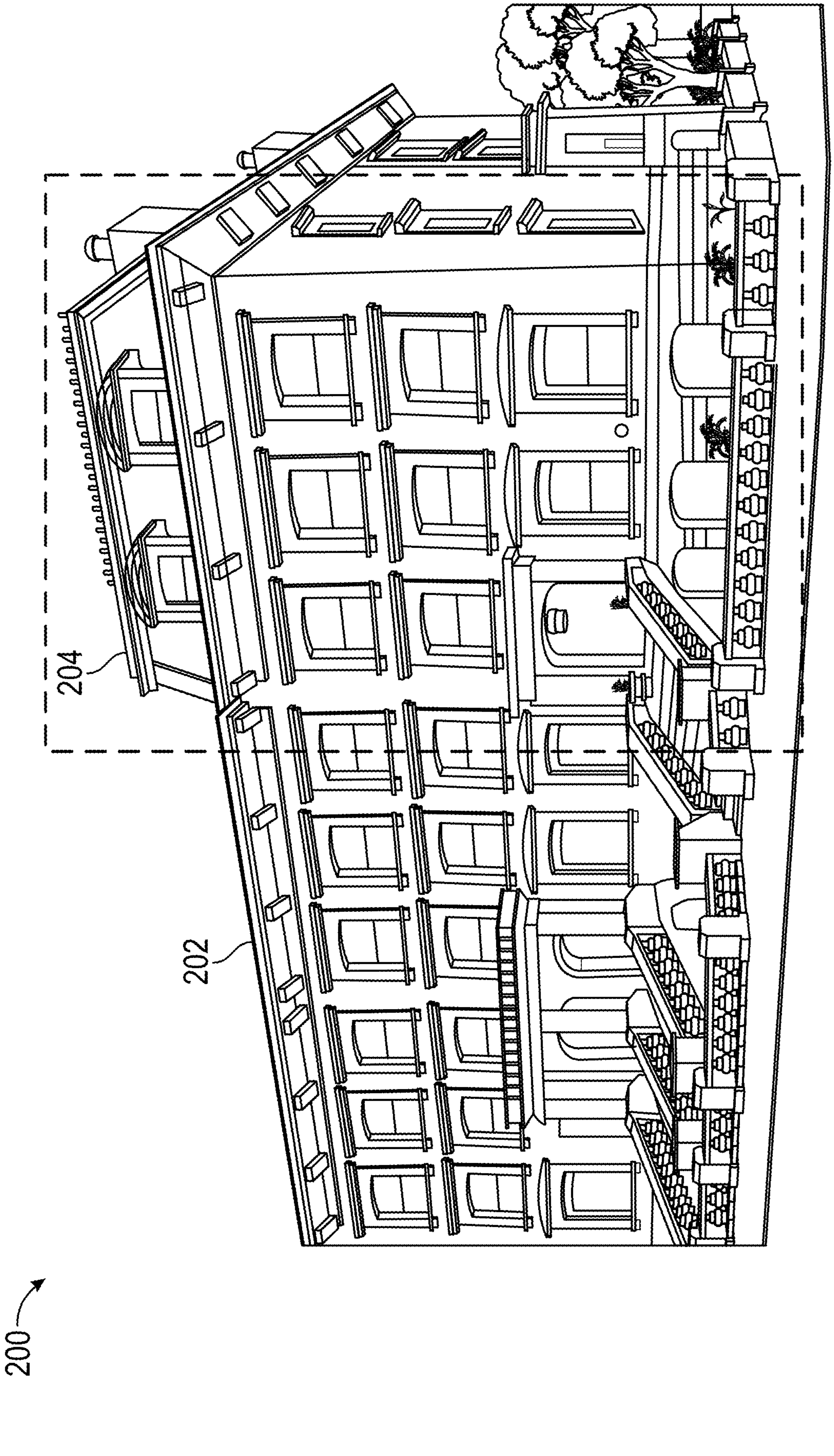
FIG. 2 shows an example visual anchor of a delivery address for providing guidance for deliveries, in accordance with various embodiments of this disclosure.

FIG. 2 shows an example 200 of a visual anchor of a delivery address for providing guidance for deliveries, in accordance with various embodiments of this disclosure. In some embodiments, the DGA associates the visual anchor with at least a portion of the physical location of the delivery address. For example, the visual anchor may be based on the physical location of the entire delivery address 134 (e.g., if the delivery address comprises a standalone house). In another example, such as that shown in example 200, the visual anchor may be based on a particular portion of the physical location of the delivery address (e.g., if the delivery address is a unit 204 within a multi-dwelling unit 202). In yet another example, the visual anchor may be based on a designated drop-off area of the delivery address (e.g., a porch or a front doorstep of unit 204).

Figure 3A:
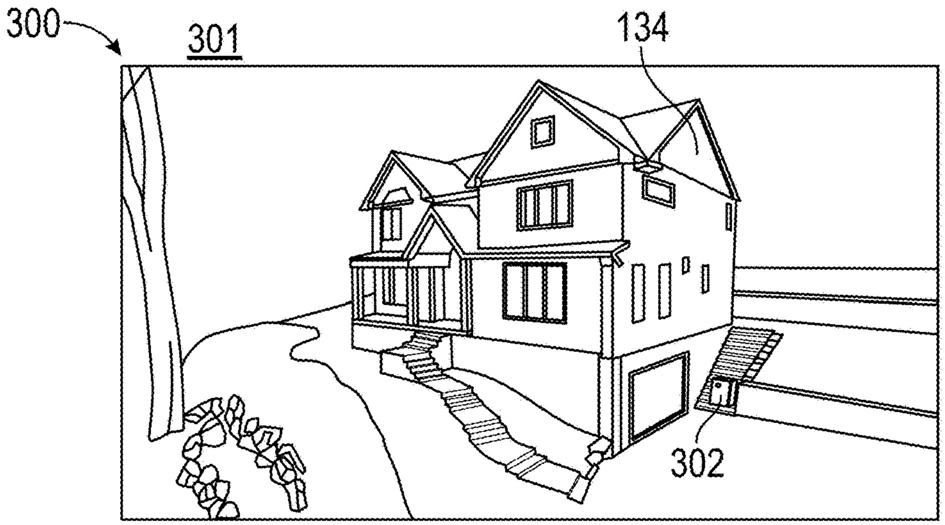
FIGS. 3A, 3B, and 3C show examples of modifying visual objects for providing guidance for deliveries based on various parameters, in accordance with various embodiments of the disclosure.
Figure 3B:
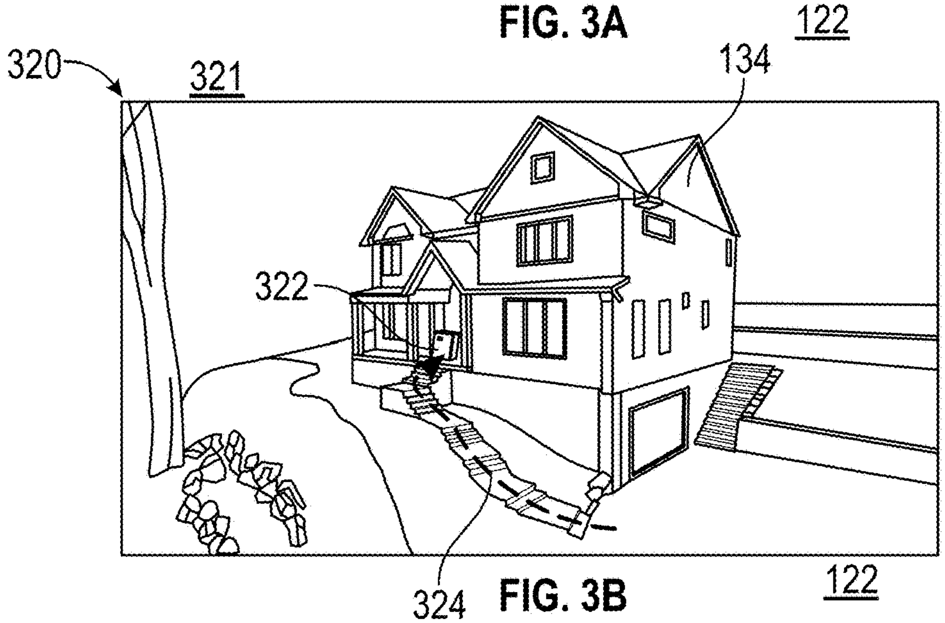
Figure 3C:
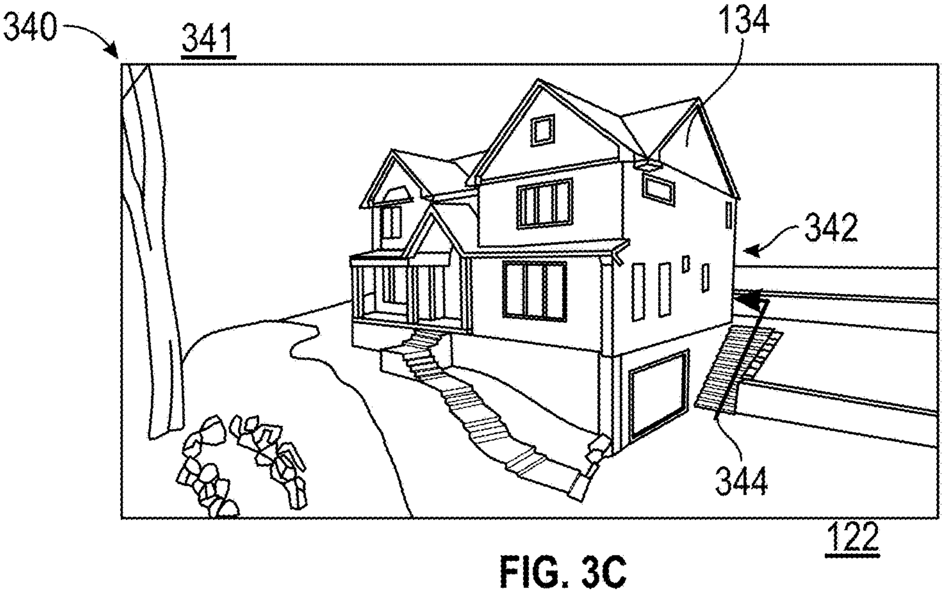

FIGS. 3A, 3B, and 3C show examples 300, 320, and 340, respectively, of modifying visual objects for providing guidance for deliveries based on various parameters, in accordance with various embodiments of the disclosure. In some embodiments, the DGA modifies the visual object based on determining whether certain parameters (e.g., conditions) are met. For example, parameters can include time-based parameters (e.g., time of day, day of week, holidays), environmental-based parameters (e.g., weather, landscape), parameters based on package data (e.g., contents of package, size of package), parameters based on user behavior or preferences (e.g., instructions history of the customer for previous orders), or any other suitable parameters. In some embodiments, based on the delivery instructions (and alternative instructions), the DGA generates a set of multiple different visual objects (e.g., visual objects 302, 322, 342) corresponding to the same visual anchor (e.g., visual anchor 160), wherein each visual object corresponds to a different condition(s). Based on determining that a particular condition(s) will occur at the time of delivery, the DGA may select the appropriate corresponding visual object for display (e.g., via UI 301, 321, 341 on the delivery driver's device, when the visual anchor matches the portion of the physical location of the delivery address as displayed within the field of view of the device).

In some embodiments, modifying the visual object comprises modifying its appearance. For instance, the DGA may alter the text font or color, or audio level (e.g., if the visual object comprises playing an audio message). For instance, the DGA may alter the appearance based on the environment, such as if it is sunny (e.g., day mode) or if it is dark out (e.g., night mode). For example, the user device (e.g., delivery driver's AR device or other suitable device) may send sensor data (e.g., environmental sensor data) to a visual object generation service (e.g., a backend service) for this modification to be possible. This may occur before the anchor is resolved (i.e., before the delivery driver views the scene that the anchor is associated with).

According to some embodiments, in FIG. 3A, visual object 302 comprises a visual representation of default instructions. For example, delivery instructions for the order may indicate that all packages generally should be delivered at the base of the steps by the garage door.

According to some embodiments, in FIG. 3B, visual object 322 comprises a visual representation of alternative instructions based on environmental conditions. For example, if the current weather is raining or flooding, then the package should be delivered to a sheltered area, such as a covered area on the front porch. The DGA may periodically collect environmental data, such as weather data. The DGA may compare the weather data with data related to the package. If the DGA determines that rain is expected within a certain time period of the expected delivery time of the package, then the DGA may identify alternative delivery instructions for handling the package based on raining conditions. The DGA may modify the visual object to present a visual representation of such alternative delivery instructions.

According to some embodiments, in FIG. 3C, visual object 342 comprises a visual representation of alternative instructions based on conditions relating to the package. For example, if the package contents include high value or fragile items, then the package should be delivered to a secure hidden area, such as at the back of the delivery address.

In some embodiments, the visual object is modified based on the user device's 120 location. For example, when delivery driver 114 arrives at the driveway of delivery address 134, a first visual object may appear (e.g., a label at the driveway such as visual object 162) instructing the driver 114 to drop off the package 116 in the back of the house. When the delivery driver 114 reaches the back steps, a second visual object (e.g., sub-navigation steps 344 and/or visual object 342) may be rendered.

In some embodiments, the location (e.g., anchor) of the visual object is modified based on changes in conditions (such as user device's 120 location). For example, a first anchor may be the driveway and a second anchor may be the back of the house. The DGA may display visual object 162 when the delivery driver 114 reaches the first anchor. The DGA may reattach the same visual object 162 to the second anchor when the delivery driver 114 makes their way up the back steps. making it appear to the delivery driver 114 as if the visual object 162 were following them as they navigate various areas of the delivery address 134.

According to some embodiments, the DGA provides sub-navigation steps to guide a delivery driver from a first point (e.g., driveway entry) at the delivery address to a second point (e.g., a designated drop-off area or other suitable sub-location, such as a front doorstep) at the delivery address. In some embodiments, when providing the delivery instructions, the customer also inputs sub-navigation steps. For instance, the customer may supplement the delivery instruction with text instructions; draw or otherwise interact with UI elements to create a visual depiction of the steps on the image of the delivery address; make gestures (e.g., swiping, dragging UI elements) in relation to the image of the delivery address simulating the sub-navigation steps, upload a video demonstrating the sub-navigation steps, or other suitable techniques for providing delivery instructions.

For example, in FIG. 3B, the customer may swipe across the image of the delivery address to indicate a sub-navigation route from the driveway and going up the front steps to reach the front porch. Based on the gesture input, the DGA may generate a visual object representing sub-navigation steps 324 (e.g., a dotted path along the steps).

In another example, in FIG. 3C, the customer may provide textual instructions describing ascending the back stairs to reach the hidden designated drop-off area. Based on the text input, the DGA may generate a visual object representing sub-navigation steps 344 (e.g., a marked path guiding up and around the back stairs). For instance, the DGA may be linked to a large language model (LLM) that can take an image and a voice recording or a text as an input and generate a visual object (e.g., comprising sub-navigation steps) as an output.

In some embodiments, the DGA generates sub-navigation steps based on using visual odometry, computer vision, or any suitable image processing model, on the delivery address. For example, the DGA can obtain image and/or inertial data (or other motion data) by way of various sensors (e.g., associated with the user device of the delivery driver) with respect to the visual and physical features of the physical location of the delivery address. Example sensors may include image sensors, inertial sensors such as an inertial measurement unit (IMU), or any other suitable sensor(s). The DGA may generate sub-navigation instructions based on the image or inertial data and delivery instructions.

In some embodiments, the DGA generates sub-navigation steps based on processing a video of the sub-navigation steps via simultaneous localization and mapping (SLAM) methods, computer vision, or any other suitable methods. For example, the customer may upload a walkthrough video following the sub-navigation steps 324. The DGA can process the video, using a SLAM model, to compute the sub-navigation steps 324. Based on computing the sub-navigation steps 324, the DGA can then generate the corresponding visual object (e.g., dotted path going up the front steps).

For example, in FIG. 3B, the delivery instructions may indicate the front porch as the designated drop-off area. Based on the image or inertial data with respect to the delivery address and the delivery instructions, the DGA may determine a first point as the base of the steps at the driveway and a second point as the designated drop-off area (e.g., the front porch). Further based on the image or inertial data and the determined first and second points, the DGA may generate sub-navigation steps 324 for navigating from the first point to the second point (e.g., walking up the steps for a certain distance, making a right turn, and continuing up the remaining distance of the steps).

In another example, in FIG. 3C, the delivery instructions may indicate a hidden area behind the delivery address as the designated drop-off area. Based on the image or inertial data with respect to the delivery address and the delivery instructions, the DGA may determine the first point as the base of the steps by the garage door and the second point as the designated drop-off area (e.g., the hidden area behind the house). Further based on the image or inertial data and the determined first and second points, the DGA may generate sub-navigation steps 344 for navigating from the first to the second point (e.g., walking up the back steps and turn left and behind the delivery address).

In some embodiments, the DGA generates the sub-navigation steps based on user preferences or past delivery instructions associated with the customer's order history. For instance, the DGA may use a trained machine learning model (e.g., trained on past deliveries) to identify an optimal area, and an optimal path to reach that area, for a package from a new order.

According to some embodiments, the DGA verifies whether the delivery driver is following the delivery instructions correctly by matching data of the delivery driver's 114 user device 120 (e.g., from image and/or inertial sensors of the user device 120 at the delivery address, or from GPS location of the user device 120) with the sub-navigation steps 324. If the DGA determines, based on the data from user device 120, that the delivery driver 114 is not following the sub-navigation steps 324 (e.g., the delivery driver 114 is walking up the back steps instead of the front steps), the DGA may notify the delivery driver 114 of the error. In some examples, the DGA may calculate alternative sub-navigation steps to reroute the delivery driver 114 back to the correct path and/or destination of the sub-navigation steps 324.

According to some embodiments, the DGA can verify the sub-navigation steps. The DGA can further correct or update the delivery instructions based on determining that the original sub-navigation steps are inaccurate, obstructed, or would otherwise be unable to successfully guide the delivery driver to the designated drop-off area. For example, the DGA may follow the original sub-navigation steps, by way of image and/or inertial sensors of the delivery driver's 114 user device 120, in relation to the delivery address. Based on visual odometry, computer vision, or other suitable image processing model, the DGA may determine that the original sub-navigation steps do not lead to the designated drop-off area, or that there is construction that is obstructing the path to the designated drop-off area. Based on determining that the original sub-navigation steps are inaccurate, the DGA may generate updated sub-navigation steps for an alternative route to the designated drop-off area. In some examples, the DGA may alert the customer (e.g., by way of the delivery platform 110) of the problem and prompt the customer to update the delivery instructions.

Figure 4:
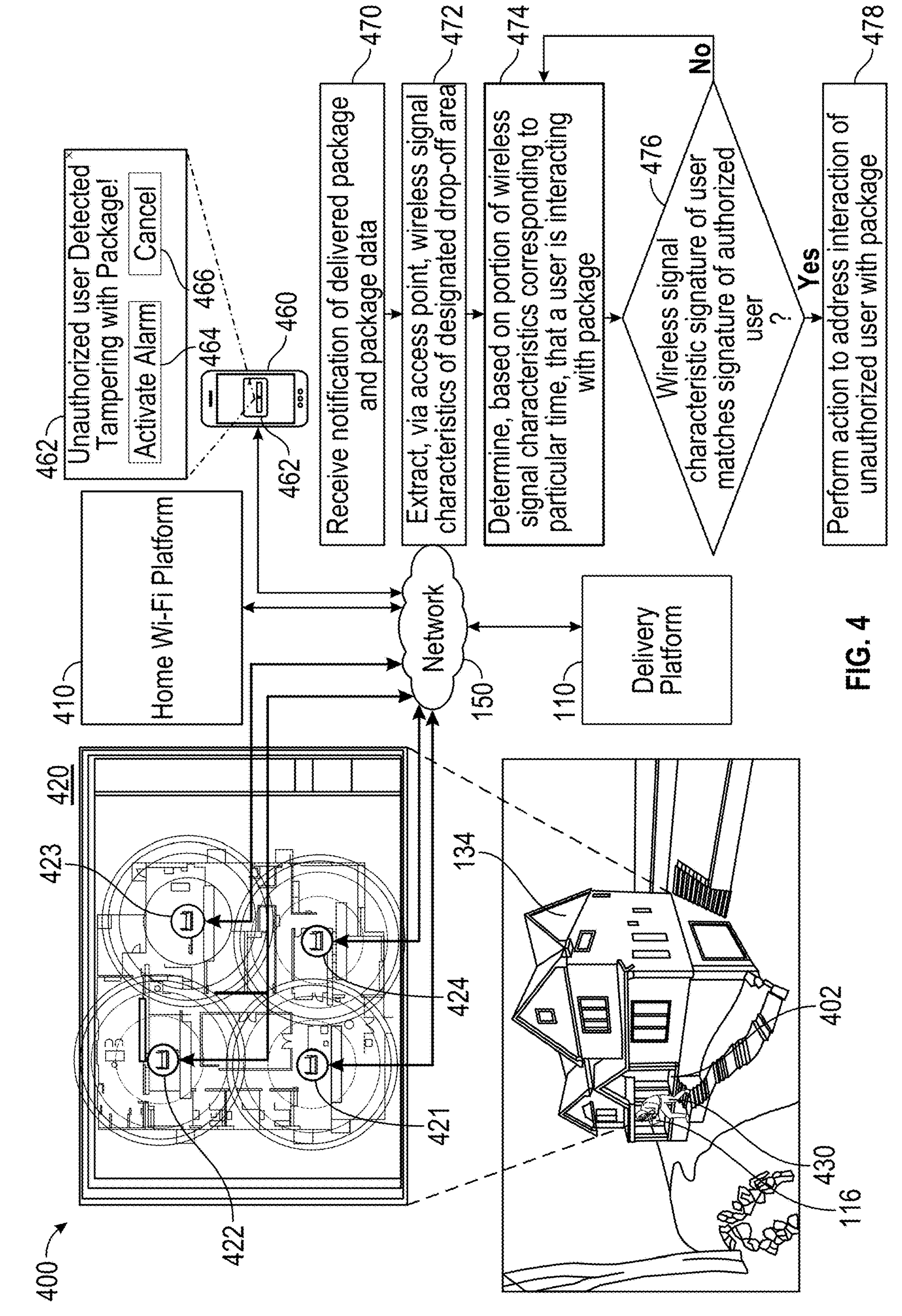
FIG. 4 shows an example scenario of monitoring delivered items, in accordance with some embodiments of this disclosure.

FIG. 4 shows an example scenario 400 of monitoring delivered items, in accordance with some embodiments of this disclosure. In some embodiments, scenario 400 comprises delivery platform 110, home Wi-Fi platform 410, network 150, and user device 460. In some embodiments, a Package Monitoring Application (PMA) is configured to perform the functionalities (or any suitable portion of the functionalities) described herein. For example, the PMA may monitor delivered packages using Wi-Fi sensing models to detect and verify the delivery of the package and to identify whether an unauthorized user is interacting with the package. The PMA may be executed at least in part at user device 160, delivery platform 110, home Wi-Fi platform 410, databases 605 or 625 of FIG. 6, and/or servers 604 or 624 of FIG. 6, or one or more remote servers (e.g., associated with platforms 110, 410), and/or at or distributed across any of one or more other suitable computing devices, in communication over any suitable type of network (e.g., the Internet, network 150).

In some embodiments, home Wi-Fi platform 410 is a wireless network system associated with delivery address 134. For example, home Wi-Fi platform 410 may comprise a plurality of access points (e.g., access points 421, 422, 423, 424) or any other suitable Wi-Fi network node. In some examples, home Wi-Fi platform 410 may comprise a smart home system. In some examples, home Wi-Fi platform 410 is configurable to manage the wireless signal sensing network 420 associated with delivery address 134. In some embodiments, platforms 110 and 410 may be controlled by or associated with the same entity.

In some embodiments, user device 460 comprises any suitable computing device configurable to display audio visual content, such as alert messages as provided by the PMA. For example, user device 460 may be a smartphone, a tablet, a handheld device, a digital assistant, a laptop, an XR device or any other suitable device capable of processing XR content, or any other suitable device, or any combination thereof. User device 460 may be associated with a customer associated with package 116 and/or with delivery address 134.

In some embodiments, delivery address 134 is associated with a wireless signal sensing network 420 comprising a plurality of access points (e.g., access points 421, 422, 423, 424) configurable to collect wireless signal data. For example, wireless signal sensing network 420 may be a Wi-Fi sensing network, a mesh sensing network, or other suitable wireless signal sensing network. For example, access points 421, 422, 423, 424 may comprise networking equipment such as, for example, routers, switches, modems, access points (including mesh access points), repeaters, extenders, Wi-Fi plugs, or any other suitable Wi-Fi node or wireless networking device. Each access point 421, 422, 423, 424 may be equipped with Multiple Input Multiple Output (MIMO) technologies, e.g., MIMO-OFDM, enabling multiple devices to communicate with access points 421, 422, 423, 424 simultaneously, or single-user MIMO, which may provide wireless signal characteristics for each corresponding set of transmit and receive antennas for particular carrier frequencies (e.g., as between antennas of a router and antennas of consumption devices). Wireless signals may propagate from the transmitter to the receiver at certain carrier frequencies along multiple paths, and a time series of wireless signal characteristics measurements capturing how wireless signals travel through surrounding objects and humans in time, frequency, and spatial domains may be determined.

The PMA may determine wireless signal characteristics (e.g., of objects within a certain range of an access point) based on the collected wireless signal data. For example, wireless signal characteristics can be based on one or more of channel state information (CSI), received signal strength indicator (RSSI) and received channel power indicator (RCPI), or other suitable wireless signal measurements.

In wireless communications, RSSI is a metric that refers to a strength of a signal received by a wireless receiver. RSSI is utilized as a coarse-level metric. RSSI indicates a quality of a wireless link between a transmitter and a receiver. RSSI is impacted by a communication medium. RSSI encounters interference and/or fading caused by objects, and movements of objects that impact reflection, scattering, and diffraction of wireless signals.

In wireless communications, CSI refers to known or previously verified channel properties of a communication link. For a Wi-Fi system with MIMO-OFDM (e.g., 802.11ax), CSI is a 3D matrix of values representing the amplitude attenuation and phase shift of multi-path Wi-Fi channels. In particular, CSI data may correspond to a three-dimensional matrix of values corresponding to a number of transmitting antennas (Tx), a number of receiving antennas (Rx) and a number of subcarriers, and may be indicative of amplitude and phase variation of a channel within a frequency used in the wireless transmissions. CSI is discussed in more detail in Y. Ma et al., "WiFi Sensing with Channel State Information: A Survey," ACM Comput. Sur., Vol. 52, No. 3, Article 46. June 2019, the contents of which are hereby incorporated by reference herein in their entirety.

According to some embodiments, at step 470 of FIG. 4, the PMA receives a notification from the delivery platform 110 that package 116 has been delivered and providing data associated with the package. For instance, the data associated with the package 116 may include characteristics of the package 116 (e.g., dimensions such as shape and size); time of delivery; location of delivery (e.g., location of the delivery address 134, location of the designated drop-off area 402, or location of the user device 120 of the delivery driver 114 at the time of delivery); data related to a code attached to the package; or other suitable information for identifying the package 116.

According to some embodiments, at step 472 of FIG. 4, the PMA extracts, via access points (e.g., a client AP and a main AP) of the home Wi-Fi platform 410, wireless signal characteristics of the designated drop-off area 402. In some embodiments, the PMA selects the client AP from among the plurality of access points 421, 422, 423, 424 that is closest to the delivered package 116 (e.g., closest to the designated drop-off area 402) for collecting wireless signal data. The PMA may select a second access point (e.g., main AP) from the plurality of access points 421, 422, 423, 424. The PMA use the client AP and the main AP to triangulate the wireless signal data during Wi-Fi sensing. The PMA may analyze the wireless signal data between each access point to detect the activity in the designated drop-off area.

The PMA may determine the client AP (e.g., the closest access point to the designated drop-off area) based one or more factors, such as the delivery instructions for the package 116 (e.g., indicating the location of the designated drop-off area), location data of the package 116, a Wi-Fi map corresponding to the wireless signal sensing network 420, a 3D map of the delivery address 134, or other suitable information. For example, based on comparing the designated drop-off area 402, a 3D map of the delivery address 134, and a Wi-Fi map corresponding to the wireless signal sensing network 420, the PMA may determine that access point 421 is the closest of the access points in wireless signal sensing network 420 to the designated drop-off area 402 where the package 116 is located. The PMA may select access point 421 as the client AP and any one of the remaining access points (e.g., access points 422, 423, 424) as the main AP.

In some embodiments, the PMA provides a UI at a user device 460 for the customer to select the closest access point or indicate the portion of the delivery address where the package should be delivered (e.g., the designated drop-off area 402).

In some embodiments, the PMA dedicates the selected access point 421 (e.g., client AP) to collect wireless signal data (e.g., of the designated drop-off area 402), while configuring neighboring or other access points (e.g., main AP) in the wireless signal sensing network 420 to perform (e.g., in conjunction with the client AP) wireless signal computations (e.g., triangulation; calculating the CSI, RSSI, or other wireless signal characteristics based on the wireless collected signal data). Dedicating a single access point closest to the package 116 to collect data, and then using the dedicated access point and another access point in the network to perform computations based on the collected data can increase the accuracy of the wireless signal sensing network 420 in obtaining wireless signal data and computing the wireless signal characteristics of nearby objects.

In some embodiments, the PMA extracts the wireless signal characteristics of the designated drop-off area 402 periodically. For example, the PMA may collect a time series of wireless signal characteristics. In some embodiments, the PMA may extract wireless signal characteristics of the designated drop-off area 402 at various times, such as if the PMA receives a notification of imminent delivery (e.g., notification that the order for the package has been placed, an estimated time of delivery of the package, notification that the delivery driver 114 is within a certain distance of the designated drop-off area 402) or notification that the package was delivered.

In some embodiments, the PMA extracts the wireless signal characteristics based on collected wireless signal data and processes such data using a Wi-Fi sensing model or any other suitable model. For example, the PMA may collect wireless signal data (e.g., CSI measurements) via medium sniffing or other suitable collection technique. The PMA may preprocess the collected wireless signal data using various techniques, such as denoising, down sampling, or artifact or outlier removal. The PMA extracts features from the preprocessed data based on various models such as inferential statistics or frequency domain analysis. The PMA classifies the output based on various classification models, such as logistic regression neural network models, models relating to package features (e.g., shape, size), or any other suitable model.

According to some embodiments, at step 474 of FIG. 4, the PMA determines, based on a portion of wireless signal characteristics corresponding to particular time, that a user 430 is interacting with the package 116. In some embodiments, the PMA makes this determination by detecting and verifying the delivered package 116 in the designated drop-off area 402 and detecting that a person is in the designated drop-off area 402 with the package 116 at a time at or after the delivery. For example, the PMA may determine whether an object or a human is present, or whether there is human activity, based on various Wi-Fi sensing models and/or learning-based models. For instance, the PMA may apply Wi-Fi sensing triangulation (e.g. Wi-Fi fingerprinting or positioning), feature extraction, density-based spatial clustering, fingerprinting, regression, filter models and threshold detection, or other suitable models on the wireless signal characteristics.

In some embodiments, the PMA detects the presence of package 116 in the designated drop-off area 402 based on determining a delta value between wireless signal characteristics of the designated drop-off area 402 at a first time prior to delivery and at a second time at (or within a short period after) the time of delivery. The delta value may correspond with wireless signal characteristics of the recently delivered object. The first time may be based on the time of expected delivery (e.g., within a certain time of the expected time of delivery, within a certain time of receiving a notification that the delivery driver is within a certain distance of the delivery address). The second time may also be based on the estimated time of delivery or based on the actual time of delivery (e.g., matching or within a certain time after a notification of the estimated or actual time of delivery). The PMA may verify that the detected object is the correct package 116 by comparing the delta value with stored data corresponding with package 116. For instance, the PMA may receive from delivery platform 110 data corresponding to the particular package 116 (e.g., a first set of dimensions of the particular package 116). The PMA may also determine from the delta value a second set of dimensions of the recently delivered object. If the PMA determines a match between the first and second set of dimensions, the PMA may verify that the correct package 116 has been delivered to designated drop-off area 402.

In some embodiments, the PMA verifies that the delivered object is the correct package 116 based on comparing known data corresponding with the correct package 116 with package information extracted from a 3D printed code associated with the delivered object. For example, the PMA may request and receive a code (e.g., barcode) from delivery platform 110 corresponding to the 3D printed code (e.g., 3D printed barcode) attached to package 116. Using various Wi-Fi sensing techniques, the PMA may extract package data (e.g., customer information, order information, delivery address information) from the 3D printed code based on the interaction of wireless signals at the edges of the package and by computing the geometrical diffraction of cone regions of the 3D printed code. The PMA may verify that the delivered object is the correct package 116 if the extracted package data matches the known data. For example, one such Wi-Fi sensing technique may include the Wiffract method, which leverages the interaction of Wi-Fi radio-frequency (RF) signals with the edges of objects that need to be imaged, guided by the principles of geometrical diffraction theory (GTD). When an RF wave encounters an edge point, it generates a cone of outgoing rays known as a "Keller cone" in accordance with GTD. A Wiffract mathematical model can capture the edges of stationary objects by utilizing GTD theory and the corresponding Keller cones. Once the Wiffract mathematical model identifies "high-confidence edge points," the model can reconstruct the shapes of objects while enhancing the resulting edge map further through advanced computer vision techniques. Wiffract is discussed in more detail in Maruccia, "'Wiffract' Wi-Fi method can read letters through walls," https://www.techspot.com/news/100151-wiffract-wi-fi-method-can-read-letters-through.html, September 2023, the contents of which are hereby incorporated by reference herein in their entirety.

In some embodiments, the PMA verifies that the detected delivered object is the correct package based on package information extracted from a pair of 3D printed labels that are affixed to different sides of the package 116. For example, the first 3D printed label may be a calibration label, and the second 3D printed label may be an identification label. The calibration label may be the same for all packages (e.g., associated with delivery platform 110), irrespective of properties of each package (e.g., size, content, destination). Because there may be variations from one home Wi-Fi platform 410 to another home Wi-Fi platform with respect to the radio frequency (RF) pattern that the wireless signal sensing network 420 of each respective home Wi-Fi platform may measure, the calibration label can establish a baseline for decoding a random pattern (e.g., RF pattern). For instance, the wireless signal sensing network 420 may perform a reading of RF signals from the labels and generates a measurement pattern based on the reading. The PMA may receive (e.g., at delivery platform 110) the measurement pattern for decoding. The PMA may then assign a first portion of the measurement pattern to the calibration label and assign a second portion of the measurement pattern to the identification label. Based on the geometry of the package 116 and the location of each label with respect to the package 116, the PMA may distinguish between the two labels. Based on matching the first portion of the measurement pattern with the calibration label, the PMA may derive a transformation function that maps the known content of the calibration label to the first portion of the measurement pattern. The PMA may use this transformation function to decode the second portion of the measurement pattern. If the PMA determines a match between the data corresponding to the order (e.g., from delivery platform 110) and extracted data from the decoded identification label, then the PMA may confirm that the correct package 116 has been delivered.

In some embodiments, the PMA verifies the detected delivered object is the correct package based on extracting data from a Radio Frequency Identification (RFID) tag associated with the package 116. For example, an RFID tag indicating shipment information (e.g., delivery address, customer information, package size, shape, weight, and contents) may be attached to the package 116. The PMA may receive the shipment information (e.g., from delivery platform 110) and encode it (e.g., by way of access point 421) in the RF signal that the access point 421 emits. The access point 421 can serve as an RFID reader, or an RFID reader may be incorporated into the access point 421. The PMA may determine a match between data extracted from the RFID tag and data from the shipment information received from the delivery platform 110. The printed passive or active RFID can operate at higher frequency bands (e.g., 6 GHz band), which allows the wireless signal sensing network 420 to harness the higher frequency signals for both power harvesting and data communication.

In some examples, the RFID tag may incorporate a fractal antenna configured to resonate at multiple higher frequency bands (e.g., 2.4 GHz, 5 GHZ, or 6 GHz bands). The fractal design can help maintain compactness while ensuring efficiency and compatibility across multiple bands. Attached to the fractal antenna, a high-frequency rectifier circuit may convert AC signals captured from Wi-Fi frequencies into a stable DC output. This circuit may use Schottky diodes optimized for minimal forward voltage drop and high-speed switching suitable for operations in the gigahertz frequency range.

In some examples, the RFID tag may include a microscale energy storage component, such as a thin-film battery or supercapacitor, to store energy harvested from ambient wireless signals. This stored energy can support and supplement the RFID tag's circuitry even when there is no or low immediate RF signal. The components of the antenna and the rectifier may be printed on a flexible, durable substrate using conductive and semiconductive inks. These inks may be formulated to ensure conductivity and performance stability at high frequencies and under various environmental conditions.

In some examples, the RFID tag may be equipped with a modulation/demodulation circuit capable of processing high-frequency signals, allowing effective communication using the same frequency bands as Wi-Fi. This can include backscatter communication protocols where the RFID tag may modulate the incident Wi-Fi signals to transmit data back to the RFID reader (e.g., comprising access point 421 or otherwise incorporated into access point 421). Due to the potential for interference in these crowded frequency bands, the PMA may instruct, or cause, access point 421 to withhold network traffic with respect to non-essential devices connected to wireless signal sensing network 420, thereby helping to increase efficiency or reducing impediments for the RFID tag to communicate with access point 421.

In some embodiments, based on verifying that the correct package 116 has been delivered, the PMA may send a notification to delivery platform 110 approving acceptance of the delivery. In some embodiments, the PMA may send a notification to user device 160 of the delivery driver 114. The notification may include one or more various user-selectable options, such as an option to review an image of the delivered package 116, accept the delivery, provide supplemental delivery instructions, or interact with the delivery driver 114 (e.g., via a microphone and speaker associated with the smart home system). For example, the PMA may reconstruct an image (e.g., crude image) of the delivered package processing the wireless signal characteristics of the package using Reconfigurable Intelligent Surface (RSI) or other suitable beamforming model.

In some embodiments, the PMA detects the presence of a person (e.g., user 430), or other suitable subject (e.g., an animal or object such as a moving vehicle), interacting with the package 116 in the designated drop-off area 402 based on determining a change in the wireless signal characteristics of the designated drop-off area 402 as well as a change in the delta value (e.g., wireless signal characteristics corresponding to the package 116) at a particular time (e.g., a time after delivery). Based on any of the aforementioned Wi-Fi sensing models and/or learning based-models, the PMA may determine that the change in the wireless signal characteristics of the designated drop-off area 402 corresponds to a user 430 located and/or moving in the designated drop-off area 402.

In some embodiments, if multiple users are detected in the designated drop-off area 402 at the same time, the PMA distinguishes the user 430 by isolating the wireless signal characteristics corresponding to each of the users' activities or movements based on, for example, Wi-Fi-based multi-user activity sensing (WiMANS) or other suitable model. WiMANS is discussed in more detail in Huang, et. al., "WiMANS: A Benchmark Dataset for WiFi-based Multi-user Activity Sensing," https://arxiv.org/pdf/2402.09430, March 2024, the contents of which are hereby incorporated by reference herein in their entirety.

According to some embodiments, at step 476 of FIG. 4, the PMA determines whether the wireless signal characteristic signature of the user 430 interacting with the package 116 matches a wireless signal characteristic signature of an authorized user. For example, the PMA may maintain a database of wireless signal characteristic signatures of users authorized to interact with the package. The PMA may determine the wireless signal characteristic signature of the user 430 based on the change in wireless signal characteristics of the designated drop-off area 402 at the particular time (e.g., when a change is detected in the wireless signal characteristics of package 116 due to the package being moved or removed). The PMA may query the database based on the wireless signal characteristic signature of the user 430. If the PMA identifies a match from the query results, then the user 430 is an authorized user. If the PMA does not identify any match, then the user 430 is an unauthorized user (or other unauthorized source of the interaction with the package 116, such as an animal or an object such as a moving vehicle damaging the package). Additionally, or alternatively, the PMA may maintain a database of wireless signal characteristic signatures of unauthorized users, which the PMA may query to determine whether the detected user 430 is expressly prohibited from interacting with the package 116.

In some embodiments, the PMA applies various parameters to the database, such as dates and times at which, or types of packages, a user is authorized to pick up, or other suitable parameters. For instance, a customer may plan to be on a vacation for two weeks and can temporarily assign their neighbor as an authorized user during those two weeks to retrieve packages. If the PMA detects that the neighbor picks up the package 116 from the designated drop-off area 402 during the authorized time period, the PMA may determine that the neighbor is an authorized user. In another instance, a customer may expect a child's surprise gift to be delivered and authorize only themselves and their spouse to pick up the gift when it arrives. The child may be an authorized user to pick up most packages, but is assigned as an unauthorized user for the particular gift. If the PMA determines that the wireless signal characteristic signature of the package 116 corresponds to that of the gift and that the wireless signal characteristic signature of the user 430 corresponds to that of the child, the PMA may determine that the user 430 is an unauthorized user for this particular package.

In some embodiments, the PMA learns which users are authorized based on user behavior or patterns. For instance, the PMA may use a trained machine learning model to determine that certain users (e.g., based on patterns in detecting their respective wireless signal characteristic signatures) visit the delivery address 134 at a certain frequency or period of time. Based on these patterns, the PMA may determine such users as authorized users. In some embodiments, the PMA updates the database of authorized users based on the received response to an alert 462 notifying of the unauthorized interaction. For instance, if the customer selects to ignore 466 the alert, the PMA may classify the user as an authorized user and update the database of authorized and/or unauthorized users. For instance, if the customer selects an option 464 to take a security action presented in the alert 462, the PMA may classify the user as an unauthorized user and update the database of authorized and/or unauthorized users accordingly.

According to some embodiments, at step 478 of FIG. 4, if the user 430 is an unauthorized user, the PMA performs an action(s) to address the unauthorized user's interaction with the package 116. For example, an action may include initiating an alarm system, a neighborhood watch system, or other security system; contacting security services or delivery platform 110, any other suitable action for monitoring, replacing, or securing the moved package; or a combination thereof. Additionally, or alternatively, the PMA may send an alert 462 to a user device 160 of the customer, wherein the alert 462 includes an option 464 to select any of the aforementioned actions or to request 466 that no actions be performed.

Figure 5:
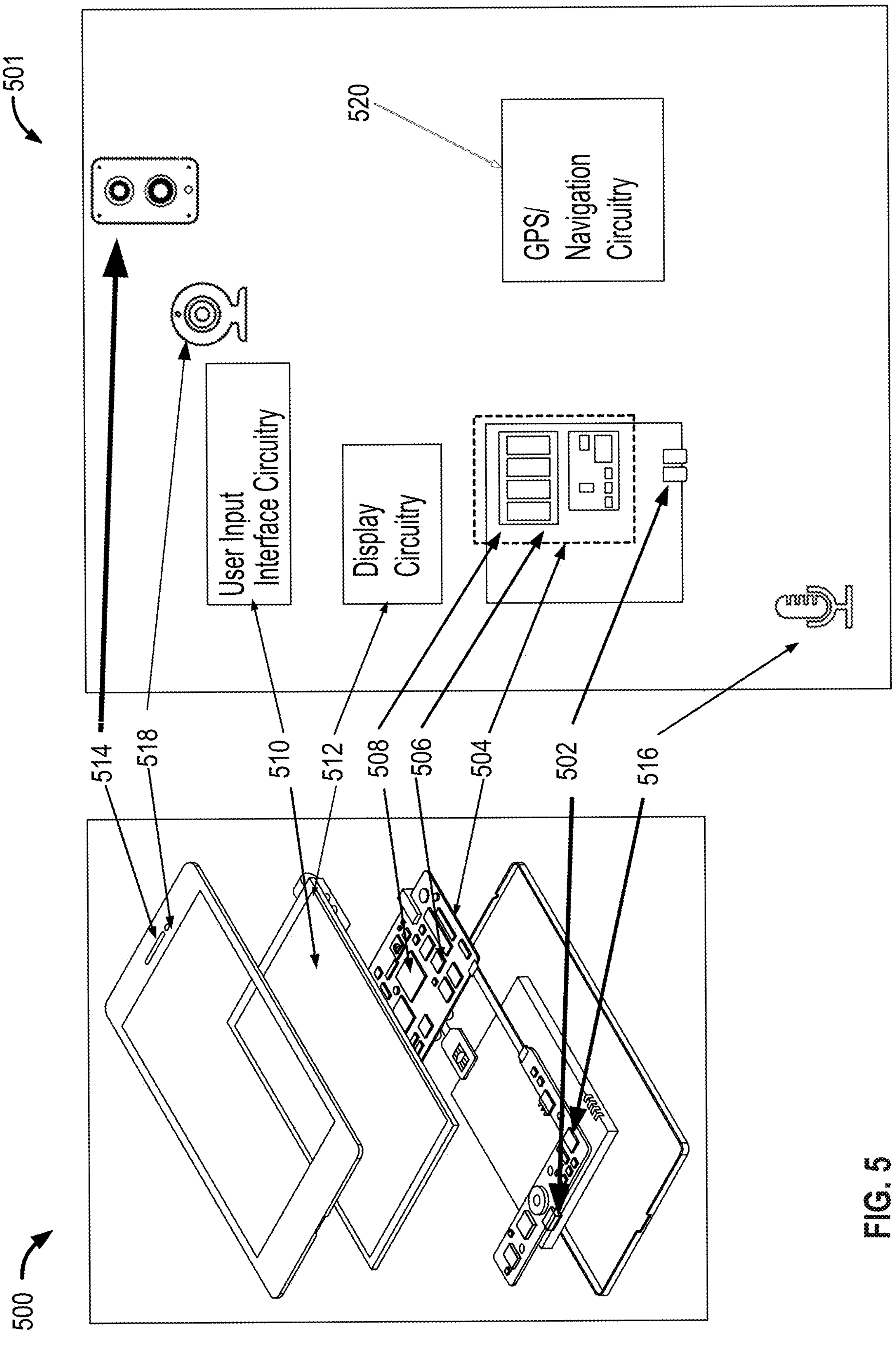
FIG. 5 shows an illustrative user equipment device, in accordance with some embodiments of this disclosure.

FIGS. 5-6 depict illustrative devices, systems, servers, and related hardware for generating guidance for delivering packages and/or monitoring packages, in accordance with some embodiments of this disclosure. FIG. 5 shows generalized embodiments of illustrative user equipment devices 500 and 501, which may correspond to the above-described user devices (e.g., user devices 120, 460). In some embodiments, user equipment device 500, 501 is a smartphone device, a tablet, XR device or any other suitable device capable of processing XR content, smart TV, IoT device, smart assistant device or home assistant device, a camera device or any other suitable computing device, a network-based server hosting a user-accessible client device, a non-user-owned device, any other suitable device, or any combination thereof. Each of user equipment device 500, 501 is communicatively connected to at least one of microphone 516, audio input equipment, camera 518, display circuitry 512, user input interface circuitry 510, and GPS/navigation circuitry 520. For example, display 512 may be a computer display, a 3D display (such as, for example, a tensor display, a light field display, a volumetric display, a multi-layer display, an LCD display or any other suitable type of display, or any combination thereof). For example, user input interface 510 may be a remote-control device.

In some embodiments, each one of user equipment device 500, 501 receives content and data via input/output (I/O) path (e.g., circuitry) 502. I/O path 502 provides data to control circuitry 504, which comprises processing circuitry 506 and storage 508. Control circuitry 504 is used to send and receive commands, requests, and other suitable data using I/O path 502, which comprises I/O circuitry. I/O path 502 connects control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the DGA and/or PMA or other suitable application stored in memory (e.g., storage 508). Specifically, control circuitry 504 may be instructed by the DGA and/or PMA to perform the functions discussed above and below. In some implementations, processing or actions performed by control circuitry 504 may be based on instructions received from the DGA and/or PMA, the delivery platform and/or the home Wi-Fi platform.

In some client/server-based embodiments, control circuitry 504 may include communications circuitry suitable for communicating with a server or other networks or servers. The DGA and/or PMA is a stand-alone application implemented on a device or a server. The PMA may be implemented as software or a set of executable instructions. The instructions for performing any of the embodiments discussed herein of the DGA and/or PMA may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500, 501.

In some embodiments, the DGA and/or PMA is a client/server application where only the client application resides on device 500, 501 and a server application resides on an external server (e.g., server 604, 624). For example, the PMA may be implemented partially as a client application on control circuitry 504 of device 500, 501 and partially on server 604, 624 as a server application running on control circuitry 611, 631, respectively. Server 604, 624 may be a part of a local area network with one or more of devices 500, 501 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 604, 624), referred to as "the cloud." Device 500, 501 may be a cloud client that relies on the cloud computing capabilities from server 604, 624 to receive and process encoded data. When executed by control circuitry of server 604, 624 the DGA, PMA, respectively, instructs control circuitry 611, 631, respectively, to perform processing tasks for the client device.

Control circuitry 504 may include communications circuitry suitable for communicating with a server, edge computing systems and devices, a table or database server, or other networks or servers. The instructions for carrying out the above-mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media application and/or gaze mapping application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500, 501. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface circuitry 510. User input circuitry 510 may be any suitable user interface circuitry, such as a remote control, mouse, trackball, keypad, keyboard, touch screen, touchpad, stylus input, joystick, voice recognition interface, or other user input interfaces. Display circuitry 512 may be provided as a stand-alone device or integrated with other elements of each one of user equipment device 500, 501. For example, display circuitry 512 may be a touchscreen or touch-sensitive display. In such circumstances, user input interface circuitry 510 may be integrated with or combined with display circuitry 512. In some embodiments, user input interface circuitry 510 includes a remote-control device having one or more microphones, buttons, keypads, any other components configured to receive user input or combinations thereof. For example, user input interface circuitry 510 may include a handheld remote-control device having an alphanumeric keypad and option buttons.

Audio output equipment 514 may be integrated with or combined with display circuitry 512. Display circuitry 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display circuitry 512. Audio output equipment 514 may be provided as integrated with other elements of each one of device 500 and equipment 501 or may be stand-alone units. An audio component of videos and other content displayed on display circuitry 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The DGA and/or PMA may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and preform any of the actions discussed herein. Based on the processed instructions, control circuitry 504 may determine what action to perform when input is received from user input interface circuitry 510. For example, movement of a cursor on a display up/down may be indicated by the processed instructions when user input interface circuitry 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the DGA and/or PMA is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500, 501. This way, the processing of the instructions is performed remotely by the server while the resulting displays (e.g., that may include text, a keyboard, or other visuals) are provided locally on device 500, 501. Device 500, 501 may receive inputs from the user via input interface circuitry 510 and transmit those inputs to the remote server for processing and generating the corresponding displays. For example, device 500, 501 may transmit a communication to the remote server indicating that an up/down button was selected via input interface circuitry 510. The remote server may process instructions in accordance with that input and generate a display of the application corresponding to the input (e.g., a display that moves a cursor up/down). The generated display is then transmitted to device 500, 501 for presentation to the user.

In some embodiments, the DGA and/or PMA may be downloaded and interpreted or otherwise run by an interpreter or virtual machine (run by control circuitry 504). In some embodiments, the PMA may be encoded in the ETV Binary Interchange Format (EBIF), received by control circuitry 504 as part of a suitable feed, and interpreted by a user agent running on control circuitry 504. For example, the media application and/or gaze mapping application may be an EBIF application. In some embodiments, the DGA and/or PMA may be defined by a series of JAVA-based files that are received and run by a local virtual machine or other suitable middleware executed by control circuitry 504. In some of such embodiments (e.g., those employing MPEG-2 or other digital media encoding schemes), the DGA and/or PMA may be, for example, encoded and transmitted in an MPEG-2 object carousel with the MPEG audio and video packets of a program.

FIG. 6 is a diagram of an illustrative system 600, in accordance with some embodiments of this disclosure. System 600 may comprise user equipment devices 607, 608, and/or networking device 610 and/or any other suitable number and types of user equipment, networking equipment capable of transmitting data by way of communication network 609. User equipment devices 607, 608 may comprise a smartphone device, a tablet, XR device or any other suitable device capable of processing XR content, smart TV, IoT device, smart assistant device or home assistant device, a camera device or any other suitable computing device, a network-based server hosting a user-accessible client device, a non-user-owned device, any other suitable device, or any combination thereof. Networking device 610 may comprise networking equipment such as routers, switches, modems, access points (including mesh access points), repeaters, extenders, Wi-Fi plugs, Wi-Fi nodes, or any other suitable device, or any combination thereof. device. Networking device 610 may be equipped with MIMO (Multiple Input Multiple Output) technologies, e.g., MIMO-OFDM. Communication network 609 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 609) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 609.

System 600 may comprise home Wi-Fi platform data source 605, delivery platform data source 625, and/or one or more servers 604, 624. In some embodiments, the PMA may be executed at one or more of control circuitry 611, 631 of servers 604, 624 respectively (and/or control circuitry of user equipment devices 607, 608 and/or networking device 610).

In some embodiments, servers 604, 624 include control circuitry 611, 631 and storage 614, 634 (e.g., RAM, ROM, Hard Disk, Removable Disk, etc.), respectively. Storage 614, 634 may store one or more databases. Server 604, 624 may also include an input/output path 612, 632, respectively. I/O path 612, 632 may provide encoding/decoding data, device information, or other data, over a local area network (LAN) or wide area network (WAN), and/or other content and data to control circuitry 611, 631, which may include processing circuitry, and storage 614, 634, respectively. Control circuitry 611, 631 may be used to send and receive commands, requests, and other suitable data using I/O path 612, 632, respectively, which may comprise I/O circuitry. I/O path 612, 632 may connect control circuitry 611, 631, respectively (and specifically control circuitry) to one or more communications paths.

Control circuitry 611, 631 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 611, 631 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611, 631 executes instructions for an emulation system application stored in memory (e.g., the storage 614, 634, respectively). Memory may be an electronic storage device provided as storage 614, 634 that is part of control circuitry 611, 631, respectively.

Home Wi-Fi platform data source 605, delivery platform data source 625, servers 604, 624, or any combination thereof, may include an encoder. Such encoder may comprise any suitable combination of hardware and/or software configured to process data to reduce storage space required to store the data and/or bandwidth required to transmit the image data, while minimizing the impact of the encoding on the quality of the media content being encoded. In some embodiments, the data to be compressed may comprise a raw, uncompressed 3D media content, or 3D media content in any other suitable format. In some embodiments, each of user equipment devices 607, 608, and/or networking device 610 may receive encoded or encoded data locally or over a communication network (e.g., communication network 609 of FIG. 6) and may comprise one or more decoders. Such decoder may comprise any suitable combination of hardware and/or software configured to convert data in a coded form to a form that is usable as video signals and/or audio signals or any other suitable type of data signal, or any combination thereof. User equipment devices 607, 608, and/or networking device 610 may be provided with encoded data. In some embodiments, at least a portion of decoding may be performed remote from user equipment devices 607, 608, and/or networking device 610.

Figure 7:
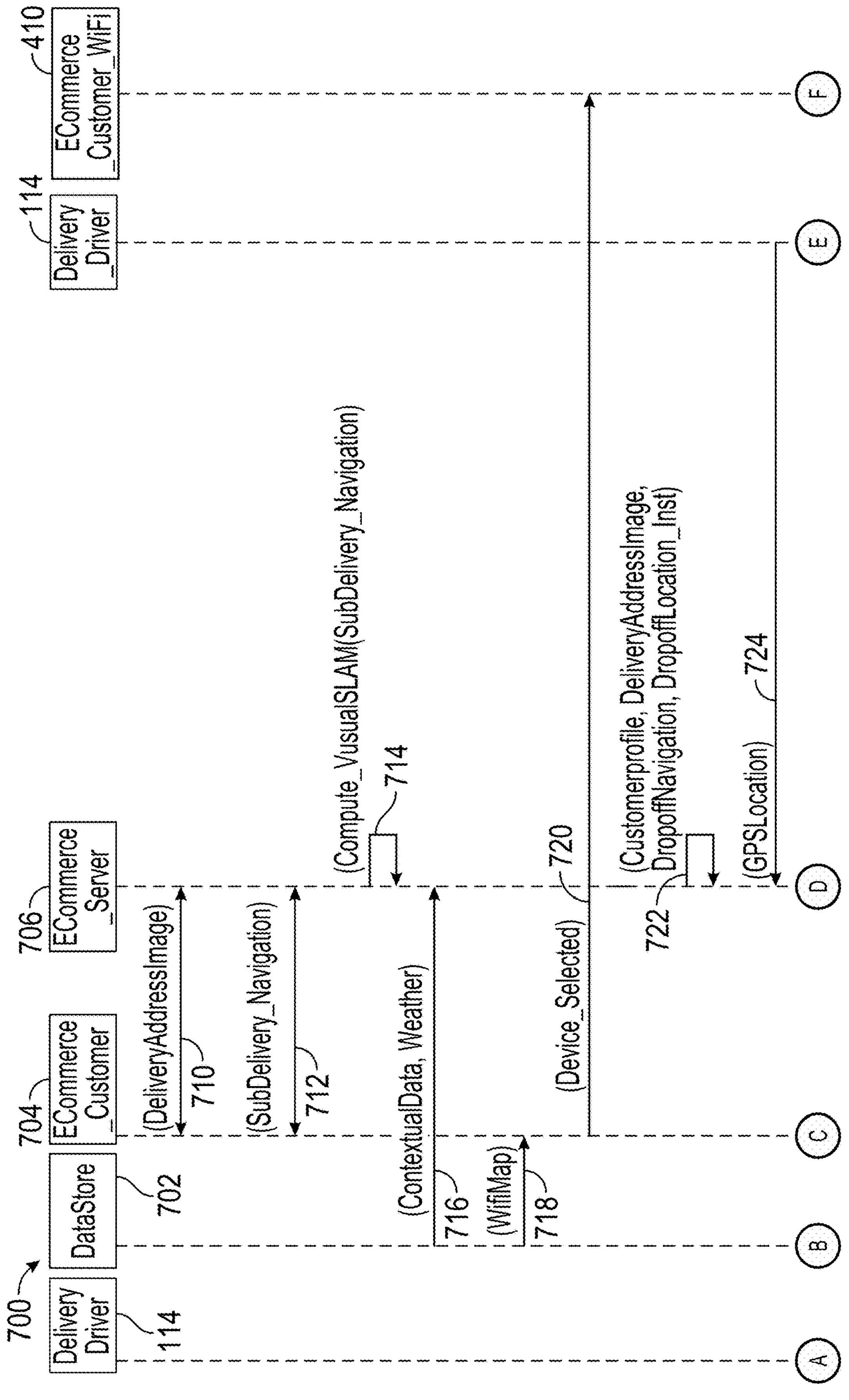
FIG. 7 is a system sequence diagram of an illustrative process for providing guidance for deliveries and monitoring delivered items, in accordance with various embodiments of the disclosure.
Figure 7:
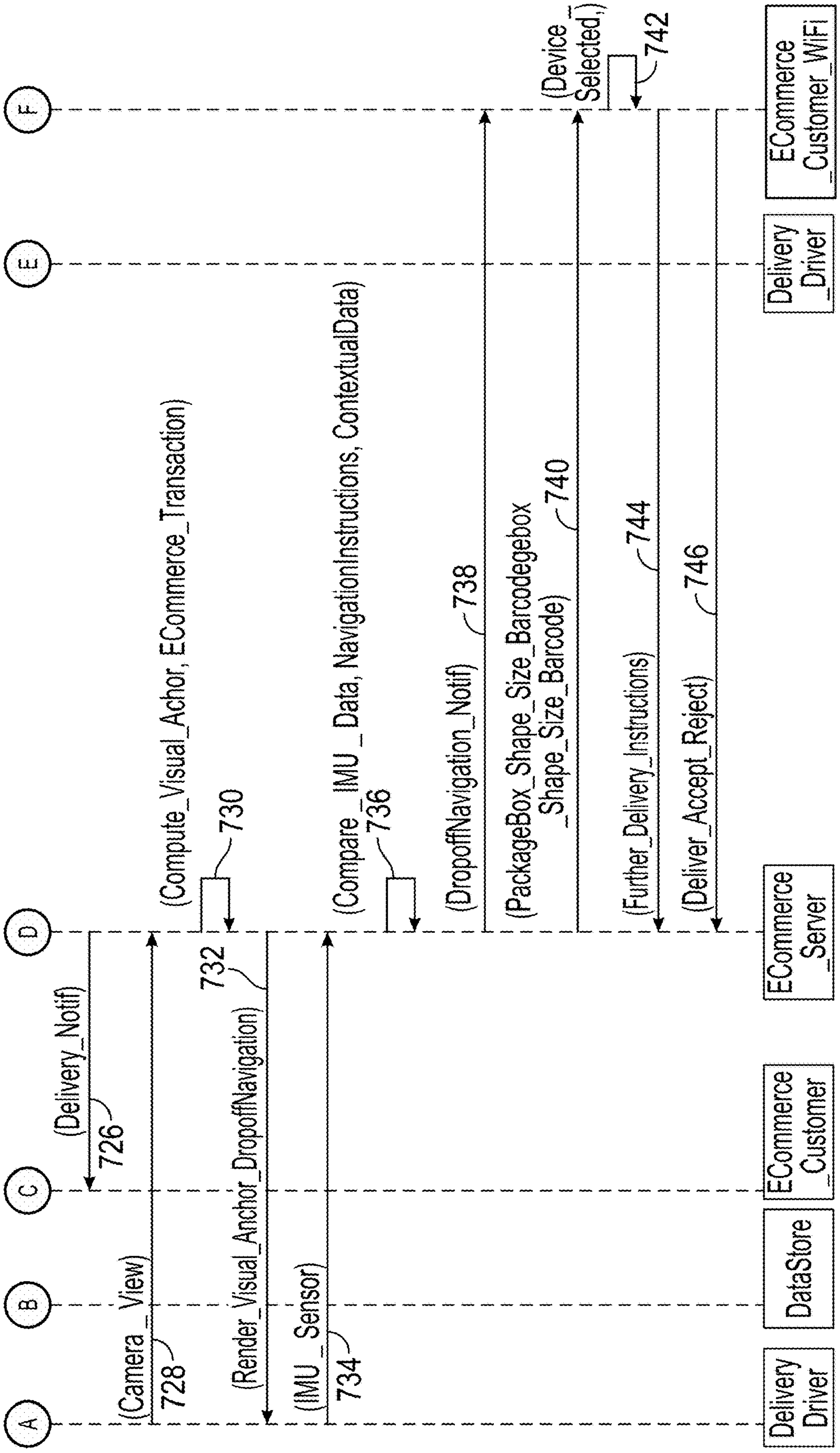
Figure 8:
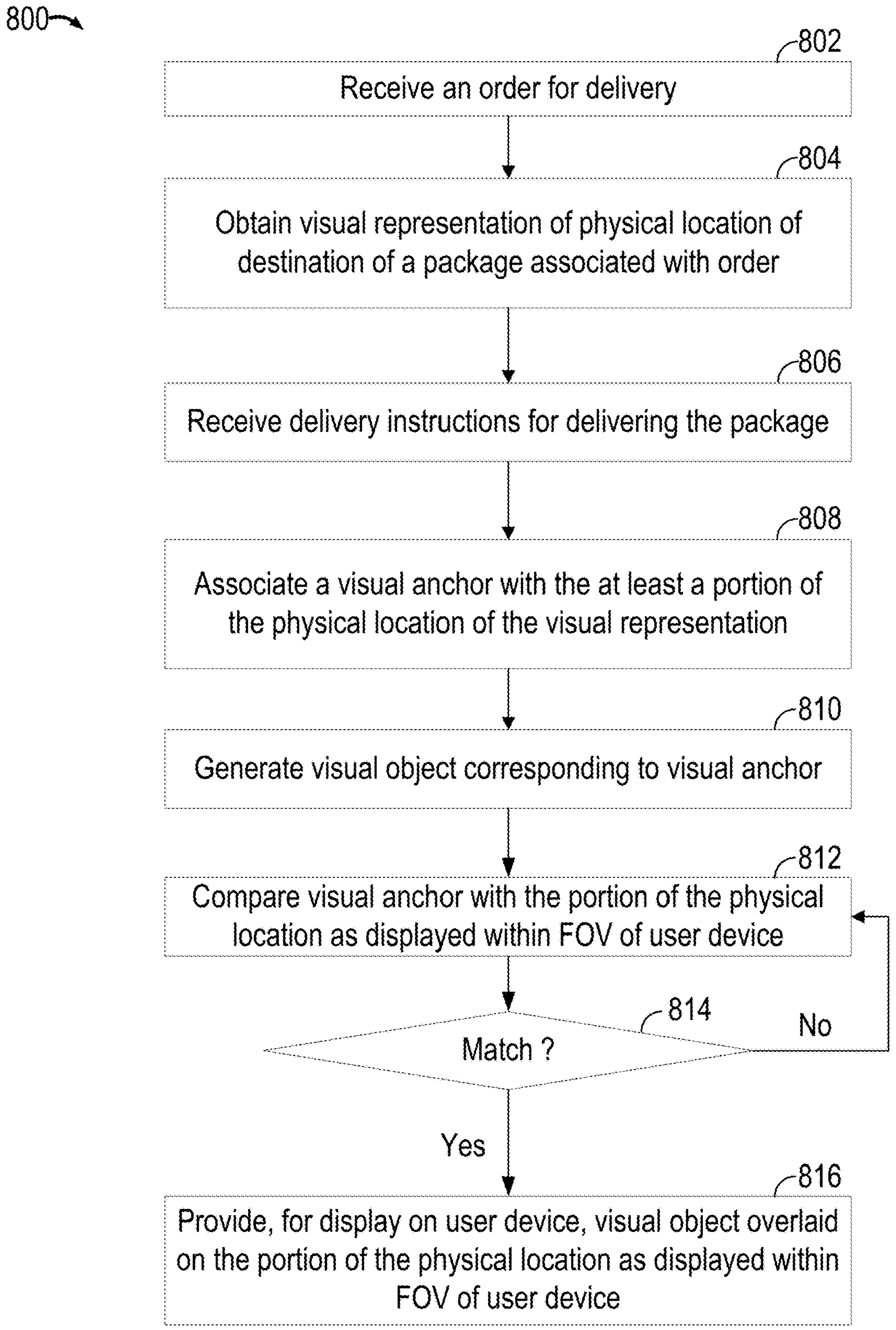
FIG. 8 is a flowchart of an example process for providing guidance for deliveries, in accordance with various embodiments of the disclosure.
Figure 9:
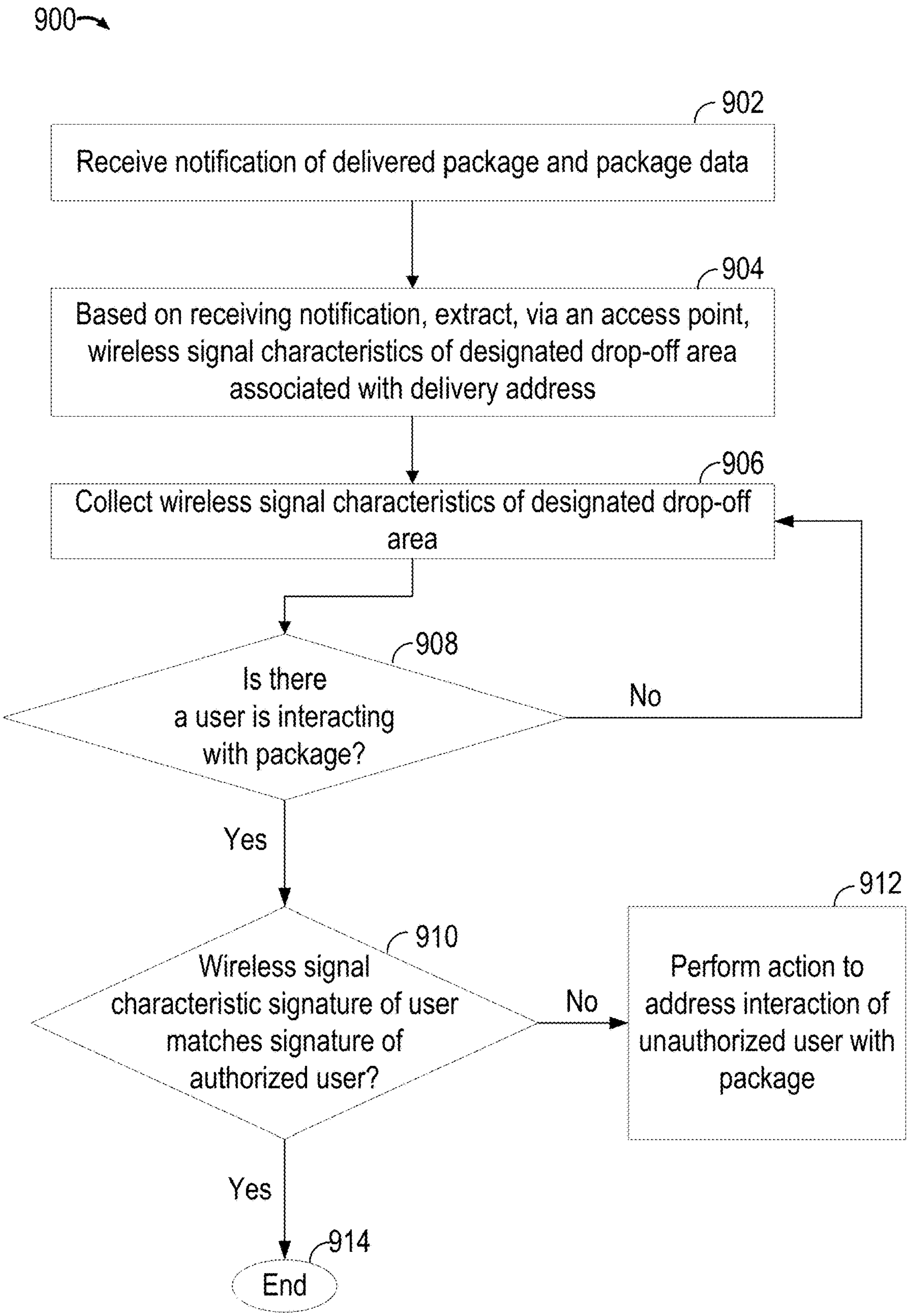
FIG. 9 is a flowchart of an example process for monitoring delivered items, in accordance with various embodiments of the disclosure.

FIGS. 7-9 are system sequence diagrams and flowcharts of various processes 700-900, respectively. In various embodiments, the individual steps of each process 700-900 may be implemented by one or more components of the devices and systems of FIGS. 5-6. Although the present disclosure may describe certain steps of each process 700-900 (and of other processes described herein) as being implemented by certain components of the devices and systems of FIGS. 5-6, this is for purposes of illustration only, and it should be understood that other components of the devices and systems of FIGS. 5-6 may implement those steps instead. For example, the steps of each process 700-900 may be executed by server 604, 624 and/or by user equipment device 607, 608, and/or 610 and/or by control circuitry 504 of a device 500, 501 and/or by control circuitry 611, 631 for package monitoring.

FIG. 7 is a system sequence diagram of an illustrative process 700 for providing guidance for deliveries and monitoring delivered items, in accordance with various embodiments of the disclosure. In some embodiments, at step 710, customer 704 uploads (e.g., by way of a user device of the customer, such as user device 460), an image of the delivery address to e-commerce server 706 (e.g., e-commerce platform, e.g., which may correspond with delivery platform 110 of FIG. 1). In some embodiments, the e-commerce platform 706 queries a database (e.g., a mapping or navigation service database) for the image of the delivery address. In some embodiments, at step 712, the customer 704 additionally provides to e-commerce server 706 delivery instructions, such as indicating a designated drop-off area at the delivery address or sub-navigation steps for guiding a delivery driver 114 to the designated drop off area. In some embodiments, the delivery instructions include conditional instructions (e.g., alternative instructions) for delivering the package when a particular parameter(s) is met (e.g., instructions to deliver the package in front of the garage when the weather is clear skies, but deliver the package to a sheltered area when the weather is rainy).

In some embodiments, at step 714, the e-commerce server 706 computes sub-navigation steps based on the image of the delivery address and the delivery instructions using SLAM methods, computer vision, or other suitable method.

In some embodiments, at step 716, e-commerce server 706 receives contextual data relating to a parameter of the delivery instructions (e.g., current weather data).

In some embodiments, at steps 718 and 720, the customer 704 selects, from a Wi-Fi map of a Wi-Fi network system of the delivery address, a networking device (e.g., an access point) that is closest to the designated drop-off area.

In some embodiments, at step 722, e-commerce server 706 associates a visual anchor with at least a portion of the physical location of the delivery address based on the customer profile data, image of the delivery address, designated drop-off area, sub-navigation steps, or other suitable data relating to delivering the package.

In some embodiments, at step 724, e-commerce server 706 tracks the location of the delivery driver 114 (e.g., by way of GPS location data of the delivery driver's 114 user device 120).

In some embodiments, at step 726, e-commerce server 706 notifies the customer 704 (e.g., at a user device 460) when the location of the delivery driver 114 is within certain distance of delivery address. E-commerce server 706 may send the visual anchor to the user device (e.g., user device 120) of the delivery driver 114.

In some embodiments, at steps 728, 730, and 732, e-commerce server 706 receives the camera view of a user device (e.g., user device 120) of the delivery driver 114. E-commerce server 706 may determine a match between the visual anchor and a portion of the physical location of the delivery address as displayed within a field of view of the user device 120. Based on determining the match, e-commerce server 706 resolves the visual anchor and renders a visual object corresponding to the visual anchor, the visual object comprising a visual representation of at least a portion of the delivery instructions.

In some embodiments, at step 734, e-commerce server 706 collects image and/or inertial data from user device 120 (e.g., by way of image or IMU sensors) as the delivery driver arrives at the delivery address and navigates to the designated drop-off area. At step 736, e-commerce server 706 may provide sub-navigation steps as the delivery driver navigates to the designated drop-off area. In some embodiments, e-commerce server 706 tracks whether the delivery driver 114 is following the sub-navigation steps and recalculates the sub-navigation steps if necessary to correct the delivery driver's path to the designated drop-off area.

In some embodiments, at steps 738 and 740, e-commerce server 706 sends a notification to the home Wi-Fi platform 410 of the customer 704 that the package has been delivered and data relating to the delivered package (e.g., package dimensions, barcodes).

In some embodiments, at step 742, home Wi-Fi platform 410 causes the selected access point to extract wireless signal characteristics of the designated drop-off area and determines, based on the extracted wireless signal characteristics that the package has been delivered. Based on verifying delivery, at step 744, the home Wi-Fi platform 410 may provide e-commerce server 706 with further delivery instructions (e.g., further notify delivery driver to reposition the package, or ring the doorbell to hand deliver the package). Additionally, or alternatively, at step 746, home Wi-Fi platform 410 may send a notification to e-commerce server 706 accepting or rejecting the delivered package.

FIG. 8 is a flowchart of an example process 800 for providing guidance for deliveries, in accordance with various embodiments of the disclosure. In some embodiments, at step 802, control circuitry 631 receives an order for delivery (e.g., by way of delivery platform 110). In some embodiments, at step 804, control circuitry 631 obtains a visual representation of the physical location of the delivery address associated with the order. The visual representation may comprise an image, multiple images, volumetric three-dimensional (3D) display, or video (e.g., of the delivery location) and/or an augmented reality (AR) and/or virtual reality (VR) representation and/or any other suitable representation, e.g., associated with the delivery location. For example, control circuitry 631 may query a database (e.g., of a mapping or navigation application) of images corresponding to the delivery address. For example, control circuitry 631 may receive an upload of the image by a user device of the customer of the order.

In some embodiments, at step 806, control circuitry 631 may receive delivery instructions for delivering a package associated with the order. For example, the delivery instructions may identify a designated drop-off area or a specific unit in an MDU. The delivery instructions may comprise other supplemental data relating to the package, such as the data identifying the delivery address (e.g., GPS coordinates, street address, cross streets, nearby landmarks, characteristics of the delivery address such as the color of the building or the type of structure of the building); contents of the package (e.g., fragile items, perishable items, high value items), characteristics of the package (e.g., size, shape, color, weight); other packages associated with the order (e.g., number of packages for the order or upcoming orders; characteristics of each of the packages); expected delivery time and date; a designated drop-off area associated with the delivery address (e.g., in front of garage door, on the porch); sub-navigation steps (such as guidance from a first point (e.g., driveway entry) at the delivery address to a second point (e.g., front doorstep); access or security information associated with the delivery address (e.g., gate code); special handling instructions (e.g., fragile or bulky items); customer information (e.g., customer order history; frequency of customer's orders over a particular time period or other data; level of customer's membership with the delivery platform or other suitable data indicating that customer is a repeat or high value customer; data relating to the package recipient if they are a different person from the customer); any other suitable delivery instructions; or a combination thereof.

In some embodiments, at step 808, based on the visual representation of the physical location of the delivery address, control circuitry 631 generates a visual anchor and associates the anchor with at the least a portion of the physical location. In some examples, the portion of the physical location may comprise any suitable part of the delivery address (e.g., front door, back steps, particular unit in an MDU). In some examples, the portion of the physical location may comprise the designated drop-off area. For instance, if the delivery instructions indicated a spot in front of the garage door as the designated drop-off area, then the visual anchor would correspond to the spot in front of the garage door. In some instances, the visual anchor may correspond to a portion of the physical location (e.g., driveway entrance) that is different from the designated drop-off area (e.g., spot in front of garage), such that the corresponding visual object may display instructions to navigate from a first point at the delivery address (e.g., driveway entrance) to the designated drop-off area (e.g., spot in front of garage). Control circuitry 631 may send the visual anchor to a user device of the delivery driver.

In some embodiments, at step 810, based on the delivery instructions, control circuitry 631 generates a visual object corresponding to the visual anchor. The visual object may comprise digital content indicative of the delivery instructions. For example, the visual object may comprise a visual and/or audio representation of at least a portion of the delivery instructions.

In some embodiments, at step 812, control circuitry 631 compares the visual anchor (e.g., at the user device of the delivery driver) with at least a portion of the physical location of the delivery address as displayed within a field of view of the user device of the delivery driver. In some embodiments, at step 814, if control circuitry 631 determines a match based on the comparison, then control circuitry 631 provides, for display on the user device, the visual object overlaid on at least the portion of physical location of the delivery address as displayed within the field of view of the user device.

FIG. 9 is a flowchart of an example process 900 for monitoring delivered items, in accordance with various embodiments of the disclosure. In some embodiments, at step 902, control circuitry 611 receives a notification (e.g., from delivery platform 110) that a package has been delivered and data associated with the package. The package may be delivered to a designated drop-off area of the delivery address.

In some embodiments, at steps 904 and 906, based on receiving the notification, control circuitry 611 extracts, via access points associated with the home Wi-Fi platform 410, wireless signal characteristics of the designated drop-off area. The access points may be connected to a wireless network associated with the delivery address. At least one of the access points may be the closest of the access points to the designated drop-off area. The closest access point may be selected to collect (e.g., capture) wireless signal data.

In some embodiments, at step 908, control circuitry 611 determines, based on the extracted wireless signal characteristics at a particular time, whether a user is present in the designated drop-off area interacting with the package. If so, then at step 910, control circuitry 611 determines whether the wireless signal characteristic signature of the detected user matches the wireless signal characteristic signature of an authorized user. For example, the control circuitry 611 may query a database of wireless signal characteristic signatures of authorized users for a match.

In some embodiments, if control circuitry 611 determines that the user is an unauthorized user (e.g., query yielded no matching results), then at step 912, control circuitry 611 performs an action to address the interaction of the unauthorized user with the package. For example, the control circuitry 611 may send an alert notifying the customer of the unauthorized interaction and a user-selectable option to perform an action such as activating an alarm or other security system.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:

obtaining an image of a physical location associated with an order for delivery, wherein the physical location comprises a destination of a package associated with the order;

receiving delivery instructions for delivering the package, wherein the delivery instructions comprise an indication of a designated drop-off area for the package at the physical location; and prior to delivery of the package:

identifying a portion of the physical location in the image that corresponds to the designated drop-off area indicated in the delivery instructions;

associating a visual anchor with the identified portion of the physical location in the image;

generating an augmented reality (AR) visual object corresponding to the visual anchor, wherein the AR visual object comprises digital content indicative of the delivery instructions;

generating, based on processing an uploaded video of the physical location and the delivery instructions, sub-navigation steps to the physical location, wherein the sub-navigation steps comprise navigation instructions from a first point at the physical location to a second point at the physical location;

generating, for display on a display of an AR mobile device, a first AR overlay at a portion of a field of view currently being displayed by the AR mobile device, the first AR overlay comprising the sub-navigation steps;

based at least in part on determining that a delivery person wearing the AR mobile device has deviated from following the sub-navigation steps, generating for display on the display of the AR mobile device, an error notification;

determining that the portion of the field of view currently being displayed by the AR mobile device at the physical location matches the portion of the physical location in the image that is associated with the visual anchor; and based at least in part on the determined match;

attaching the AR visual object to the visual anchor;

providing, for simultaneous display on the display of the AR mobile device, the AR visual object overlaid within the field of view on the AR mobile device and a second AR overlay at the portion of the field of view currently being displayed by the AR mobile device to provide a real-time confirmation that the portion of the field of view currently being displayed by the AR mobile device corresponds to the designated drop-off area;

determining a change in the field of view currently being displayed by the AR mobile device;

based at least in part on determining that a portion of the changed field of view currently being displayed by the AR mobile device at the physical location matches a second portion of the physical location in the image that is associated with a second visual anchor:

reattaching the AR visual object to the second visual anchor such that the AR visual object remains overlaid within the changed field of view on the AR mobile device.

2. The computer-implemented method of claim 1, further comprising:

tracking a location of the AR mobile device; and based on determining that the location of the AR mobile device is within a certain distance of the physical location, sending the visual anchor to the AR mobile device.

3. The computer-implemented method of claim 1, wherein the delivery instructions comprise at least one of: a description of the designated drop-off area, confirmation of address, data related to the order, data related to the package, data related to a user profile associated with the order or a corresponding to the designated drop-off area.

4. The computer-implemented method of claim 1, wherein the obtaining the image of the physical location further comprises:

receiving, from a user device associated with a user profile associated with the order, an upload of the image of the physical location, wherein the user device is different from the AR mobile device.

5. The computer-implemented method of claim 1, wherein the obtaining the image of the physical location further comprises:

sending a query to at least one data source, wherein the query comprises an address of the destination; and receiving, from the at least one data source, the image of the physical location corresponding to the address of the destination.

6. The computer-implemented method of claim 1, wherein the delivery instructions are based on at least one parameter comprising one or more of: a time of day, a day of week, environment, value of the package, contents of the package, or user preferences.

7. The computer-implemented method of claim 6, further comprising:

determining a change in the at least one parameter; and modifying at least one of an appearance or location of the AR visual object based on the change in the at least one parameter.

8. The computer-implemented method of claim 1, further comprising:

collecting, from at least one sensor, image or inertial data in relation to the physical location;

further based on the image or inertial data in relation to the physical location, generating the sub-navigation steps for navigating from the first point at the physical location to the second point at the physical location, the second point corresponding to the designated drop-off area; and wherein the digital content indicative of the delivery instructions is further based on the sub-navigation steps.

9. A system comprising:

control circuitry configured to:

obtain an image of a physical location associated with an order for delivery, wherein the physical location comprises a destination of a package associated with the order;

receive delivery instructions for delivering the package, wherein the delivery instructions comprise an indication of a designated drop-off area for the package at the physical location; and prior to delivery of the package:

identify a portion of the physical location in the image that corresponds to the designated drop-off area indicated in the delivery instructions;

associate a visual anchor with the identified portion of the physical location in the image;

generate an augmented reality (AR) visual object corresponding to the visual anchor, wherein the AR visual object comprises digital content indicative of the delivery instructions;

generate, based on processing an uploaded video of the physical location and the delivery instructions, sub-navigation steps to the physical location, wherein the sub-navigation steps comprise navigation instructions from a first point at the physical location to a second point at the physical location;

generate, for display on a display of an AR mobile device, a first AR overlay at a portion of a field of view currently being displayed by the AR mobile device, the first AR overlay comprising the sub-navigation steps;

based at least in part on determining that a delivery person wearing the AR mobile device has deviated from following the sub-navigation steps, generate for display on the display of the AR mobile device, an error notification;

determine that the portion of the field of view currently being displayed by the AR mobile device at the physical location matches the portion of the physical location in the image that is associated with the visual anchor; and based at least in part on the determined match:

attach the AR visual object to the visual anchor;

provide, for simultaneous display on a display of the AR mobile device, the AR visual object overlaid within the field of view on the AR mobile device and a second AR overlay at the portion of the field of view currently being displayed by the AR mobile device to provide a real-time confirmation that the portion of the field of view currently being displayed by the AR mobile device corresponds to the designated drop-off area;

determine a change in the field of view currently being displayed by the AR mobile device;

based at least in part on determining that a portion of the changed field of view currently being displayed by the AR mobile device at the physical location matches a second portion of the physical location in the image that is associated with a second visual anchor:

reattach the AR visual object to the second visual anchor such that the AR visual object remains overlaid within the changed field of view on the AR mobile device.

10. The system of claim 9, wherein the control circuitry is further configured to:

track a location of the AR mobile device; and based on determining that the location of the AR mobile device is within a certain distance of the physical location, send the visual anchor to the AR mobile device.

11. The system of claim 9, wherein the delivery instructions comprise at least one of: a description of the designated drop-off area, confirmation of address, data related to the order, data related to the package, data related to a user profile associated with the order, or a point corresponding to the designated drop-off area.

12. The system of claim 9, wherein the control circuitry configured to obtain the image of the physical location is further configured to:

receive, from a user device associated with a user profile associated with the order, an upload of the image of the physical location, wherein the user device is different from the AR mobile device.

13. The system of claim 9, wherein the control circuitry configured to obtain the image of the physical location is further configured to:

send a query to at least one data source, wherein the query comprises an address of the destination; and receive, from the at least one data source, the image of the physical location corresponding to the address of the destination.

14. The system of claim 9, wherein the delivery instructions are based on at least one parameter comprising one or more of: a time of day, a day of week, environment, value of the package, contents of the package, or user preferences.

15. The system of claim 14, wherein the control circuitry is further configured to:

determine a change in the at least one parameter; and modify at least one of an appearance or location of the AR visual object based on the change in the at least one parameter.

16. The system of claim 9, wherein the control circuitry is further configured to:

collect, from at least one sensor, image or inertial data in relation to the physical location; and further based on the image or inertial data in relation to the physical location, generate sub-navigation steps for navigating from the first point at the physical location to the second point at the physical location, the second point corresponding to the designated drop-off area; and wherein the digital content indicative of the delivery instructions is further based on the sub-navigation steps.

17. The method of claim 1, wherein the AR mobile device corresponds to an AR passthrough display being worn by the delivery person who is delivering the package to the physical location.

18. The method of claim 1, wherein the providing for simultaneous display is performed prior to the package being placed by the delivery person at the designated drop-off area.

19. The method of claim 1, wherein:

the receiving the delivery instructions for delivering the package comprises receiving a text description of the designated drop-off area; and the identifying the portion of the physical location in the image that corresponds to the designated drop-off area indicated in the delivery instructions comprises:

prior to the delivery of the package, using one or more computer vision techniques to identify a visual portion of the physical location in the image that corresponds to the text description.

20. The method of claim 1, wherein:

the delivery instructions comprises conditional instructions for delivering a package to a first designated drop-off area based on at least one of a first time of day or first type of weather conditions being experienced, and for delivering a package to a second designated drop-off area based on at least one of a second time of day or second type of weather conditions being experienced; and identifying the portion of the physical location in the image that corresponds to the designated drop-off area indicated in the delivery instructions comprises identifying either the first designated drop-off area or the second designated drop-off area as the designated drop-off area based at least in part on comparing at least one of a current time of day or current weather conditions to at least one of the first time of day or the first type of weather conditions, and comparing at least one of the current time of day or the current weather conditions to at least one of the second time of day or the second type of weather conditions.

* * * * *